US010810635B2

(12) United States Patent
Nishio et al.

(10) Patent No.: US 10,810,635 B2
(45) Date of Patent: Oct. 20, 2020

(54) SERVER APPARATUS, TERMINAL APPARATUS, NON-TRANSITORY COMPUTER-READABLE STORAGE MEDIUM HAVING INFORMATION PROCESSING PROGRAM STORED THEREIN, INFORMATION PROCESSING SYSTEM, INFORMATION PROCESSING METHOD, AND DATA STRUCTURE

(71) Applicant: Nintendo Co., Ltd., Kyoto (JP)

(72) Inventors: Kenichiro Nishio, Kyoto (JP); Yasumasa Miyoshi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 911 days.

(21) Appl. No.: 14/629,844

(22) Filed: Feb. 24, 2015

(65) Prior Publication Data

US 2015/0242909 A1    Aug. 27, 2015

(30) Foreign Application Priority Data

Feb. 25, 2014 (JP) ................................ 2014-034091

(51) Int. Cl.
*G06Q 30/02* (2012.01)
(52) U.S. Cl.
CPC ..... *G06Q 30/0277* (2013.01); *G06Q 30/0273* (2013.01)
(58) Field of Classification Search
CPC ..... G06Q 30/02; G06Q 30/0207–0277; H04N 21/812; H04N 21/23424; H04N 21/2547; H04N 7/17318; H04N 21/4312; H04N 21/47217; H04L 67/02; G06F 16/9535; G06F 17/2235; G06F 3/0482; G06F 3/04842; G06F 3/04883; G06F 3/04845; G06F 3/0488; G06F 3/017; G06F 3/167; A63F 2300/69
See application file for complete search history.

(56) References Cited

U.S. PATENT DOCUMENTS

| | | | | |
|---|---|---|---|---|
| 2003/0208472 A1* | 11/2003 | Pham | ...................... | H04L 29/06 |
| 2007/0219940 A1* | 9/2007 | Mueller | ................. | G06Q 30/02 |
| 2009/0204474 A1* | 8/2009 | Gogri | ..................... | G06Q 30/02 |
| | | | | 705/14.6 |
| 2010/0138452 A1* | 6/2010 | Henkin | ............. | G06Q 30/0256 |
| | | | | 707/803 |

(Continued)

FOREIGN PATENT DOCUMENTS

| | | |
|---|---|---|
| JP | 2002-132836 | 5/2002 |
| JP | 2004-295267 | 10/2004 |

(Continued)

*Primary Examiner* — Chinyere Mpamugo
(74) *Attorney, Agent, or Firm* — Nixon & Vanderhye P.C.

(57) ABSTRACT

In an example system, specific information indicating a specific display element (character string or the like) and link destination information about a page for advertisement or purchase/sale are stored so as to be associated with each other. Upon request for a webpage, a specific display element is detected among display elements to be displayed on the page, and if such a specific display element is detected, browse source data for displaying the webpage in which the detected display element is hyperlinked so as to allow jumping to an advertisement page is generated and transmitted.

17 Claims, 16 Drawing Sheets

(56) References Cited

U.S. PATENT DOCUMENTS

2011/0015996 A1* 1/2011 Kassoway ............ G06F 16/9558
                                                      705/14.49
2013/0013990 A1*  1/2013 Green ................ G06Q 30/0241
                                                       715/205
2013/0326583 A1* 12/2013 Freihold ................ G06F 21/32
                                                         726/3

FOREIGN PATENT DOCUMENTS

| JP | 2008-287583    | 11/2008 |
| WO | 2007/113904 A1 | 10/2007 |

* cited by examiner

| ADVERTISER ID | LINK DESTINATION DATA | OTHER INFORMATION |
|---|---|---|
| 00001 | http://xxxx.xxx | .... |
| 00002 | http://xxx.xxx | .... |
| ⋮ | ⋮ | ⋮ |

| ADVERTISEMENT KEYWORD DATA | ASSOCIATION TABLE ID | PURCHASE/SALE DATA |
|---|---|---|
| ○○○○ | #00001 | ... |
| △△△ | #00002 | ... |
| ◇◇◇◇◇◇◇ | #00003 | ... |
| ⋮ | ⋮ | ⋮ |

SERVER APPARATUS, TERMINAL APPARATUS, NON-TRANSITORY COMPUTER-READABLE STORAGE MEDIUM HAVING INFORMATION PROCESSING PROGRAM STORED THEREIN, INFORMATION PROCESSING SYSTEM, INFORMATION PROCESSING METHOD, AND DATA STRUCTURE

CROSS REFERENCE TO RELATED APPLICATION

The disclosure of Japanese Patent Application No. 2014-034091, filed on Feb. 25, 2014, is incorporated herein by reference.

FIELD

The exemplary embodiments relate to an information processing system that allows posting and sharing of contents by predetermined users, and to a server apparatus and the like used therein.

BACKGROUND AND SUMMARY

Conventionally, there is known an advertisement system for putting an advertisement on a webpage on the Internet. In addition, there is known a method for displaying a so-called banner advertisement. Further, there is known a technique of, in the case where a plurality of windows are displayed on a screen, always monitoring whether or not a window other than a banner advertisement has become active, and then when a window other than the banner advertisement has become active, displaying the banner advertisement on the top.

Such a technique of displaying a banner advertisement on the top as described above enables a banner advertisement to more efficiently catch user's eyes. However, for example, in the case where the size of a screen is rather small as in a hand-held terminal such as a smartphone, if such a banner advertisement is always displayed on the top, a part of such a small-sized screen is occupied by the banner advertisement. Therefore, a screen that a user originally wants to look at becomes narrow and difficult to view, and for such reasons, display of a banner advertisement may even make a user uncomfortable. For example, in the case where a user utilizes an SNS or the like on the user's hand-held terminal, if a part of a screen is always occupied by a banner advertisement, the screen is difficult to view and the usability deteriorates, or in some cases, a user may stop utilizing the SNS service, thus leading to inhibition of communications among users.

Therefore, the exemplary embodiments will be given to describe a server apparatus, a terminal apparatus, a non-transitory computer-readable storage medium having an information processing program stored therein, an information processing system, an information processing method, and a data structure, that allow advertisements to be put efficiently while preventing inhibition of communications among users in a network as much as possible. It is noted that non-transitory computer-readable storage media as used herein include a magnetic medium such as a flash memory, a ROM, or a RAM, and an optical medium such as a CD-ROM, a DVD-ROM, or a DVD-RAM.

Configuration examples to achieve the above are as follows.

One configuration example is a server used in an information processing system for providing a service that allows posting and sharing of a text by a user in a network. The server includes a processor configured to: store advertisement keyword information indicating an advertisement keyword which can be contained in the posted text, and link destination information indicating a location, in the network, of a page for advertisement or purchase/sale, which is a webpage purposing advertisement or purchase/sale for a product or service, such that the advertisement keyword information and the link destination information are associated with each other; receive a request for transmitting a browse page containing the text, from a terminal; detect the advertisement keyword in the text to be displayed on the browse page, based on the advertisement keyword information; generate browse source data for displaying, on the terminal, a browse page in which a part related to the detected advertisement keyword is hyperlinked based on the link destination information associated with the advertisement keyword; and transmit the generated browse source data to the terminal that has performed the request.

The above configuration example makes it possible to efficiently put an advertisement while preventing inhibition of communications among users in a network such as an SNS as much as possible.

Another configuration example is a server used in an information processing system for providing a service that allows posting and sharing of a content by a user in a network. The server includes a processor configured to: store specific information indicating a specific display element among display elements that can be displayed in the posted content, and link destination information indicating a location, in the network, of a page for advertisement or purchase/sale, which is a webpage purposing advertisement or purchase/sale for a product or service, such that the advertisement keyword information and the link destination information are associated with each other; receive a request for transmitting a browse page containing the content, from a terminal; detect whether or not there is the specific display element among display elements to be displayed on the browse page, based on the specific information; when the specific display element is detected, generate browse source data for displaying, on the terminal, a browse page in which a part related to the detected specific display element is hyperlinked based on the link destination information associated with the specific information; and transmit the generated browse source data to the terminal that has performed the request. Here, the display element refers to an element that can be displayed as a posted content such as a text or an image, on a screen. In other words, this element can become one of elements composing a displayed content (including a webpage displayed on a terminal).

The above configuration example makes it possible to efficiently put an advertisement while preventing inhibition of communications among users in a network such as an SNS as much as possible.

In another configuration example, the location, in the network, of the page for advertisement or purchase/sale may be outside the service provided in the information processing system. For example, the page for advertisement or purchase/sale may be stored in a server different from the server of the information processing system, or the page for advertisement or purchase/sale may have a different domain name. The processor may be further configured to authenticate a user to utilize the service, and only a user authenticated by the user authentication may be allowed to post or browse the content.

The above configuration example makes it possible to efficiently put an advertisement also into a closed network such as a membership-type SNS. For example, it is possible to put an advertisement into a place where users who are comparatively interested in the advertisement content gather.

In another configuration example, the link destination information indicating the page for advertisement or purchase/sale may be stored in accordance with a request from an advertiser which is different from the user who has posted the content. The processor may be further configured to receive, from a predetermined advertiser, a request for storing a predetermined display element and predetermined link destination information such that the predetermined display element and the predetermined link destination information are associated with each other, and the processor may store the link destination information corresponding to the advertiser and specific information indicating the display element designated by the advertiser such that the link destination information and the specific information are associated with each other, in accordance with the reception of the registration request. The processor may be further configured to determine whether or not payment has been done with respect to the request received by the advertisement request reception, and the processor may store the link destination information corresponding to the request from the advertiser and the display element designated by the advertiser, such that the link destination information and the display element are associated with each other, after the payment has been completed.

The above configuration example allows an advertiser to put an advertisement also into a closed network such as a membership-type SNS. In addition, work for putting an advertisement can be automated.

In another configuration example, the processor may be further configured to: determine a status of usage of jumping to the page for advertisement or purchase/sale via the specific information, based on information indicating a user's operation on the specific information and transmitted from the terminal; and calculate a usage fee for which the advertiser is to be charged, in accordance with the determined usage status.

The above configuration example makes it possible to calculate an advertisement fee in accordance with an actual usage condition such as the fact that each user has actually jumped to each advertiser's site, thereby enabling proper price calculation.

In another configuration example, the processor may be further configured to determine whether or not a predetermined condition about period is satisfied which is a condition about a valid period of the association between the link destination information and the specific information. The processor may be further configured to determine whether or not a predetermined condition is satisfied which is a condition about the number of times of jumping via specific information to the page for advertisement or purchase/sale determined based on information indicating a user's operation on the specific information and transmitted from the terminal. Even when it is detected that the specific display element indicated by the specific information is contained among the display elements to be displayed on the browse page to be transmitted, if it is determined that the valid period condition is satisfied, or if it is determined that the page jumping number-of-times condition is satisfied, the processor may generate the browse source data without hyperlinking the part related to the display element.

The above configuration example makes it possible to set a period in which an advertisement function is valid.

In another configuration example, the processor may be further configured to count the number of times of jumping to the page for advertisement or purchase/sale based on information indicating a user's operation on the specific information and transmitted from the terminal, for each specific information or each user who has posted a content containing the specific display element.

The above configuration example makes it possible to grasp the advertisement usage condition, for each specific information, or for each of users who have posted contents containing the specific information.

In another configuration example, the processor may store the specific information and the link destination information such that a single specific display element and one or more pieces of link destination information are associated with each other.

The above configuration example allows one display element (for example, a trendy keyword) to be utilized by a plurality of advertisers, for example.

In another configuration example, the specific display element may be a specific character string.

The above configuration example makes it possible to use a character string such as a trendy keyword, as an advertisement medium, for example.

In another configuration example, the processor may generate the browse source data so that a display manner for the hyperlinked part is different from a display manner for another part.

The above configuration example makes it easy for a user to visually recognize a character string by which the user can move (jump) to an advertisement page, for example.

Another configuration example is a terminal used in an information processing system for providing a service that allows posting and sharing of a text by a user in a network. The terminal includes a processor configured to: receive input data from an input device; perform control for displaying, on a display, a webpage for providing the service, that contains a first display element associated with plural pieces of link destination information; determine whether or not the first display element associated with the plural pieces of link destination information is selected, based on the input data; when it is determined that the first display element associated with the plural pieces of link destination information is selected, perform control for further displaying, on the display, a plurality of second display elements for respectively indicating the plural pieces of link destination information associated with the first display element; and perform control for jumping to a link destination selected from the second display elements based on the input data.

The above configuration example makes it possible to jump to a plurality of link destinations via a character string displayed on a webpage, for example. Therefore, for example, a screen having a narrow size like a hand-held terminal such as a smartphone can be efficiently used.

In another configuration example, the second display elements may be images corresponding to the respective link destinations associated with the first display elements.

The above configuration example makes it easy to visually recognize which company's site each link destination information is linked to, for example.

In another configuration example, information that composes the webpage and corresponds to the first display element may include information as a reference for a display position of each second display element.

The above configuration example makes it possible to designate the position for displaying the second display element. For example, the popularity order of link destination companies can be reflected in such display positions.

In another configuration example, when a first operation, based on the input data, indicating selection of the first display element is performed the processor may further display the second display elements, and when a second operation, based on the input data, different from the first operation is performed, the processor may not display the second display elements.

The above configuration example makes it possible to cause the second display element not to be displayed when, in a scroll operation on a touch panel, a finger contacting the touch panel temporarily passes on the display position of the first display element without intention to select, for example.

In another configuration example, when an operation, based on the input data, for selecting the first display element has been continuously performed by a user for a predetermined time period or longer, the processor may further display the plurality of second display elements, and when the selecting operation is released, if the selected position immediately before the release is changed to a position of one of the plurality of second display elements, the processor may perform control for jumping to a link destination corresponding to the second display element at the selected position immediately before the release.

The above configuration example makes it possible to jump to a link destination by a series of operations of displaying a plurality of second display elements by a press-and-hold operation on a touch panel, selecting one of the second display elements while keeping touching, and then taking off the touch panel, for example, thus enhancing the operability.

In another configuration example, when a third display element contained in the webpage associated with only one piece of link destination information is selected based on the input data, the processor may perform control for jumping to the link destination associated with the third display element. The first display element and the third display element may be displayed in display manners different from each other.

The above configuration example makes it possible to, when a tap operation is performed on a character string associated with only one link destination, jump to the link destination, and when a tap operation is performed on a character string associated with a plurality of link destinations, display the second display elements, for example. In addition, by making the font colors different from each other, it becomes possible to visually recognize whether a single link destination or a plurality of link destinations are associated.

In another configuration example, information that composes the webpage and corresponds to the first display element may include information for defining one of the plurality of link destinations as a default link destination. When a third operation which is different from the first operation and the second operation and indicates decision to jump to the link destinations associated with the first display element is performed based on the input data, the processor may perform control for jumping to one of the link destinations associated with the first display element without displaying the second display elements.

The above configuration example makes it possible to provide a user with such an operation that, on a character string associated with a plurality of link destinations, when a single tap operation is performed, the second display element is displayed, and when a double tap operation is performed, the screen instantly jumps to a link destination set as a default, for example, thus enhancing convenience for a user.

Another configuration example is an information processing method for controlling a computer of a terminal used in an information processing system for providing a service that allows posting and sharing of a text by a user. The information processing method includes: receiving input data from an input device; displaying a webpage for providing the service, that contains an advertisement keyword associated with plural pieces of link destination information; determining whether or not the advertisement keyword associated with the plural pieces of link destination information is selected, based on the input data; when it is determined that the advertisement keyword associated with the plural pieces of link destination information is selected, further displaying advertisement images for respectively indicating the plural pieces of link destination information associated with the advertisement keyword; determining whether or not each advertisement image is selected by the user; and performing control for jumping to a link destination indicated by the advertisement image determined to be selected.

The above configuration example makes it possible to efficiently put an advertisement without occupying a part of a screen by an advertisement banner or the like and therefore without inhibiting communications among users in a network such as an SNS, for example.

Another configuration example is an information processing system including at least one server and a plurality of terminals, for providing a service that allows posting and sharing of a content by users with use of the terminals. The server includes a processor configured to: store specific information indicating a specific display element among display elements that can be displayed in the posted content, and link destination information indicating a location, in the network, of a page for advertisement or purchase/sale, which is a webpage purposing advertisement or purchase/sale for a product or service, such that the specific information and the link destination information are associated with each other; receive a request for transmitting a browse page containing a predetermined content, from each terminal; detect the specific display element among display elements to be displayed on the browse page, based on the specific information: generate browse source data for displaying, on the terminal, a browse page in which a part related to the detected specific display element is hyperlinked based on at least one piece of the link destination information associated with the specific information; and transmit the generated browse source data to the terminal that has performed the request. Each terminal includes a processor configured to: receive input data from an input device; display the browse page based on the browse source data; determine whether or not each display element contained in the browse page is selected, based on the input data; when it is determined that the display element is selected, if a plurality of link destinations are associated with the display element, display second display elements respectively indicating the plurality of link destinations, so as to be superimposed on the browse page; and when the display element is selected and a plurality of link destinations are associated with the display element, perform control for jumping to a link destination selected from the second display elements, based on the input data, and when the display element is selected and a single link destination is associated with the display element, perform control for jumping to the single link destination.

The above configuration example makes it possible to efficiently put an advertisement without occupying a part of a screen by an advertisement banner or the like and therefore without inhibiting communications among users in a network such as an SNS, for example.

Another configuration example is a data structure used in processing for generating a webpage. The data structure has one text element and plural pieces of link destination information. The data structure is configured to store the one text element and the plural pieces of link destination information such that the one text element is associated with the plural pieces of link destination information, so as to allow generation of such a webpage that only the text element is displayed on the webpage, and when a predetermined operation is performed on the text element, information indicating the plural pieces of link destinations is displayed in a superimposed manner.

In the above configuration example, for example, a plurality of link destinations are associated with a single character string, and a user can select the link destinations by performing, for example, a tap operation on such a character string. Thus, it becomes possible to efficiently use a space of a screen.

According to the exemplary embodiments, it becomes possible to efficiently use a space of a screen and efficiently put an advertisement without inhibiting communications among users in a network.

DETAILED DESCRIPTION OF NON-LIMITING EXAMPLE EMBODIMENTS

Hereinafter, the exemplary embodiments will be described. It is to be understood that as used herein, elements and the like written in a singular form with a word "a" or "an" attached before them do not exclude those in a plural form.

Figure 1:
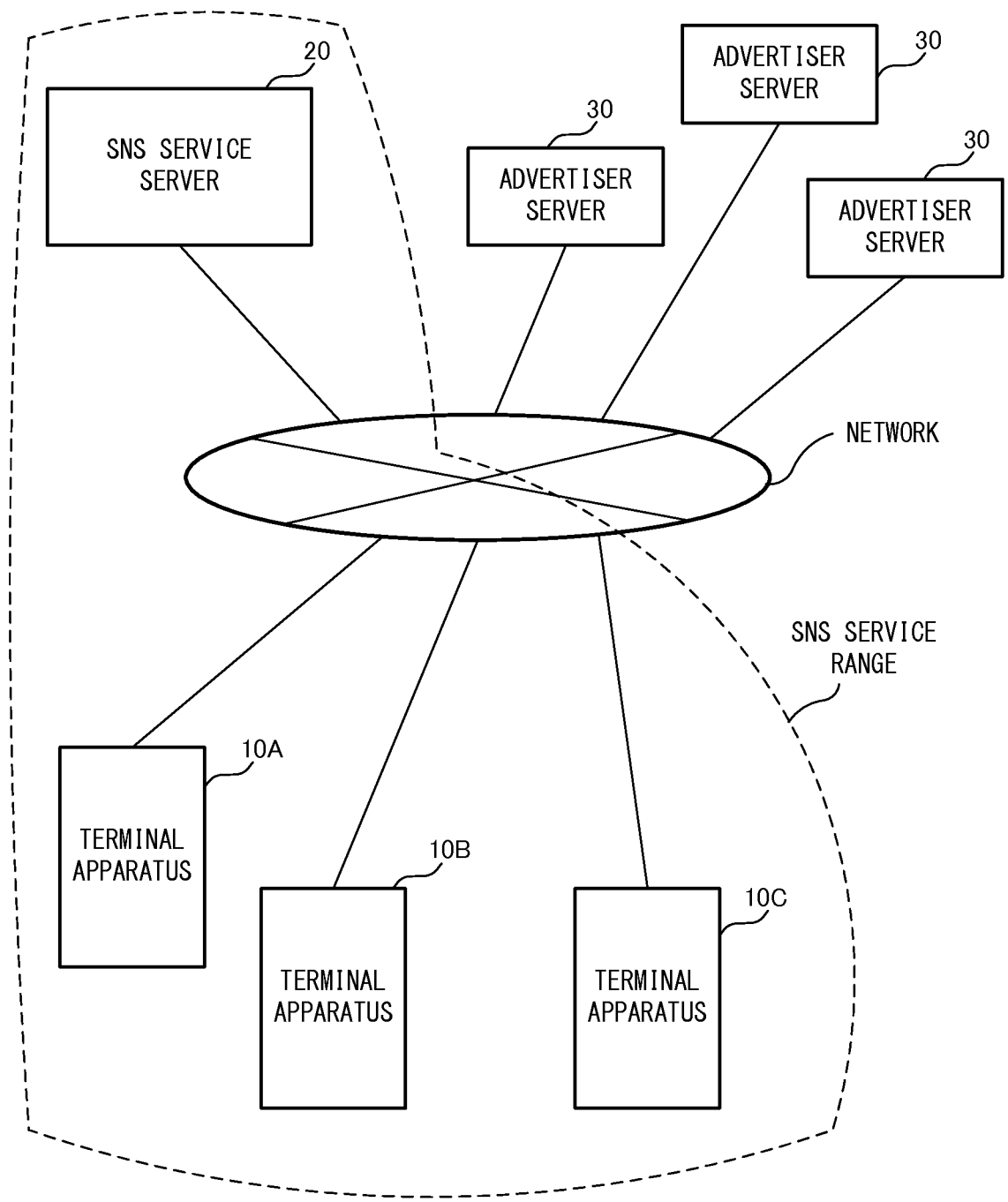
FIG. 1 is a schematic diagram showing a non-limiting example of the entirety of an information processing system according to an exemplary embodiment.

FIG. 1 is a schematic diagram showing a non-limiting example of the entirety of an information processing system according to an exemplary embodiment. In the information processing system of the exemplary embodiment, an SNS service server 20, a plurality of terminal apparatuses 10A to 10C (hereinafter, may be collectively referred to as terminal apparatuses 10), and a plurality of advertiser servers 30 are configured to be connectable and communicable with each other via a network (for example, the Internet). The terminal apparatuses are, for example, hand-held terminal apparatuses such as a smartphone, a mobile phone, or a PDA, or so-called tablet-type information processing apparatuses (in another exemplary embodiment, they may be terminal apparatuses such as a personal computer). The exemplary embodiment assumes that in such a system, a so-called social networking service (hereinafter, SNS) is executed between the SNS service server 20 and the plurality of terminal apparatuses 10. In addition, the exemplary embodiment assumes, particularly, a membership service of community type, among such services. For example, a service in which users are to be registered for utilization (a service in which user account information or the like is stored in the SNS service server 20) is assumed. Each user can "post" a predetermined content (for example, a predetermined text, an image, etc.) (to the SNS service server 20). More specifically, account information (user ID or password) is generated based on a request from a user, and is stored in the SNS service server 20. Only a user who has inputted the account information and has been authenticated can post and browse a predetermined content. Hereinafter, this content is referred to as a "post content". In addition, each user can "browse" a post content of another user (or the user's own post content).

In addition, in the exemplary embodiment, regarding the relationship among users, for example, only users for which the relationship "friend" is set are allowed to browse each other's content. That is, in browsing by each terminal apparatus, a post content posted by a user who is not a "friend" cannot be browsed, and only a post content posted by a user in a "friend" relationship is displayed. Here, "friend" in the exemplary embodiment refers to a relationship in which users are authenticated by each other. For example, a user A transmits a request for setting the user A as a friend to a user B (for which a friend relationship with the user A has not been set yet). In response, the user B approves the request, whereby both users are set as "friends" for the first time.

Here, in the exemplary embodiment, the SNS service is indicated as a range surrounded by a dashed line in FIG. 1, and basically, the advertiser servers 30 are elements that are not included in the SNS service. That is, the advertiser servers 30 are servers outside the SNS service, and can be regarded as elements that can provide another service different from the SNS service. As used herein, the "outside (of the SNS service)" refers to the case where the advertiser servers 30 are server apparatuses that are physically different from the SNS service server, or the case where the domain names of the advertiser servers are different from the domain name of the SNS service, for example. The exemplary embodiment relates to a system for advertisement and publicity in which it is assumed that, in the above configuration, an "outside" advertiser as described above performs advertisement and publicity for its products in the above SNS service (as it were, closed network).

Figure 2:
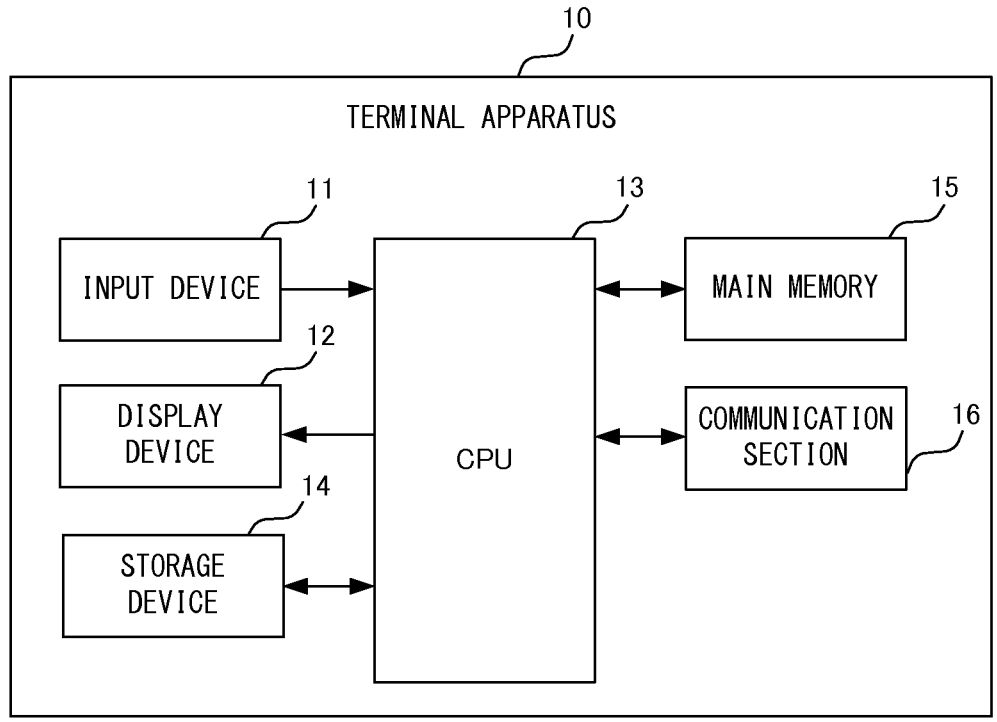
FIG. 2 is a functional block diagram showing a non-limiting example of the configuration of a terminal apparatus 10.

FIG. 2 shows a non-limiting example of the functional block configuration of the terminal apparatus 10. In FIG. 2, the terminal apparatus 10 has an input device 11, a display device 12, a CPU 13, a storage device 14, a main memory 15, and a communication section 16. The input device 11 is operated by a user of the terminal apparatus 10 and outputs a signal corresponding to the user's operation. The input device 11 is, for example, a cross switch, a push button, or a touch panel. In the exemplary embodiment, particularly, the terminal apparatus 10 is assumed to have a touch panel as the input device. The display device 12 displays an image generated in the terminal apparatus 10, on a screen thereof. The display device 12 is, typically, a liquid crystal display device. The storage device 14 stores a computer program to be executed by the CPU 13 and various kinds of data to be used in the program. The storage device 14 is, for example, a flash EEPROM or a hard disk device. The main memory 15 temporarily stores a computer program and information. The communication section 16 establishes connection to a network by wired or wireless communication, and transmits predetermined data to the SNS server 20 or another terminal apparatus or receives predetermined data from the SNS server 20 or another terminal apparatus.

Figure 3:
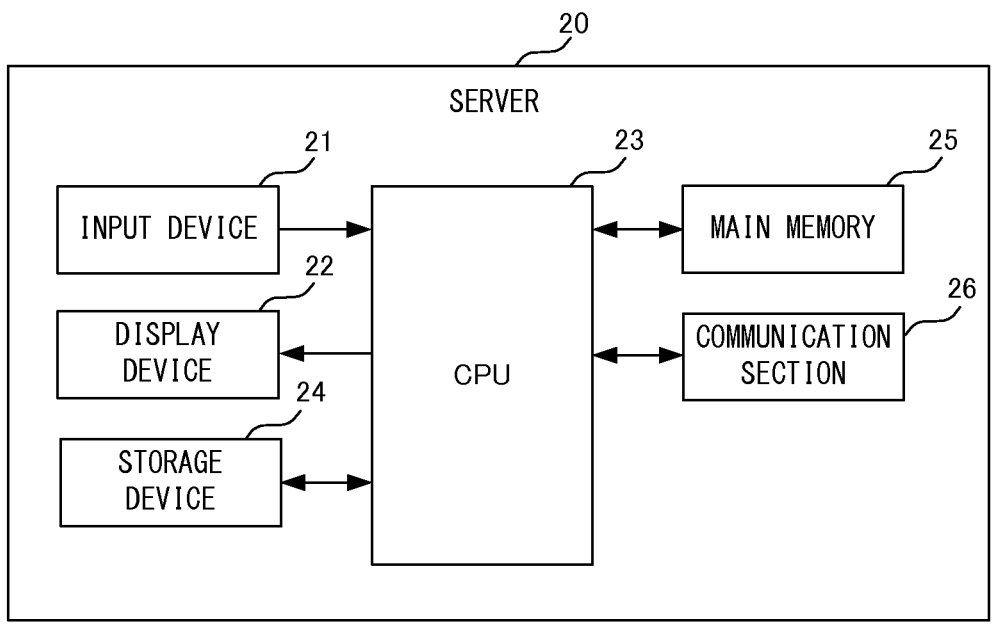
FIG. 3 is a functional block diagram showing a non-limiting example of the configuration of the server apparatus 20.

FIG. 3 shows a non-limiting example of the functional block configuration of the SNS service server 20 (hereinafter, referred to as an SNS server). In FIG. 3, the SNS server 20 has an input device 21, a display device 22, a CPU 23, a storage device 24, a main memory 25, and a communication section 26. The input device 21 is a keyboard or a mouse, for example. The display device 22 is a display device or the like, for example. The storage device 24 stores a computer program to be executed by the CPU 23 and various kinds of data to be used in the program. The storage device 24 is, for example, a hard disk device. The main memory 25 temporarily stores a computer program and information. The communication section 26 establishes connection to a network by wired or wireless communication, and performs transmission and reception of predetermined data with another terminal apparatus.

Next, the advertiser server 30 will be described. Basically, the functional block configuration of the advertiser server 30 is the same as that of the SNS server 20. Therefore, the functional block configuration of the advertiser server 30 is not shown in the drawings. The advertiser server 30 has stored therein various kinds of data forming the advertiser's site. Also the advertiser server 30 is connected to the network so that the advertiser server 30 can perform transmission and reception of data with the terminal apparatus 10 and the SNS server 20. A user of the terminal apparatus 10 can browse the advertiser's site by accessing the advertiser server 30 by an operation described later, and can also purchase a product or the like at the site.

In another exemplary embodiment, the input device 21 and the display device 22 may not be provided on the server side. That is, the input device 21 and the display device 22 may be provided or may not be provided on the server side.

Figure 4:
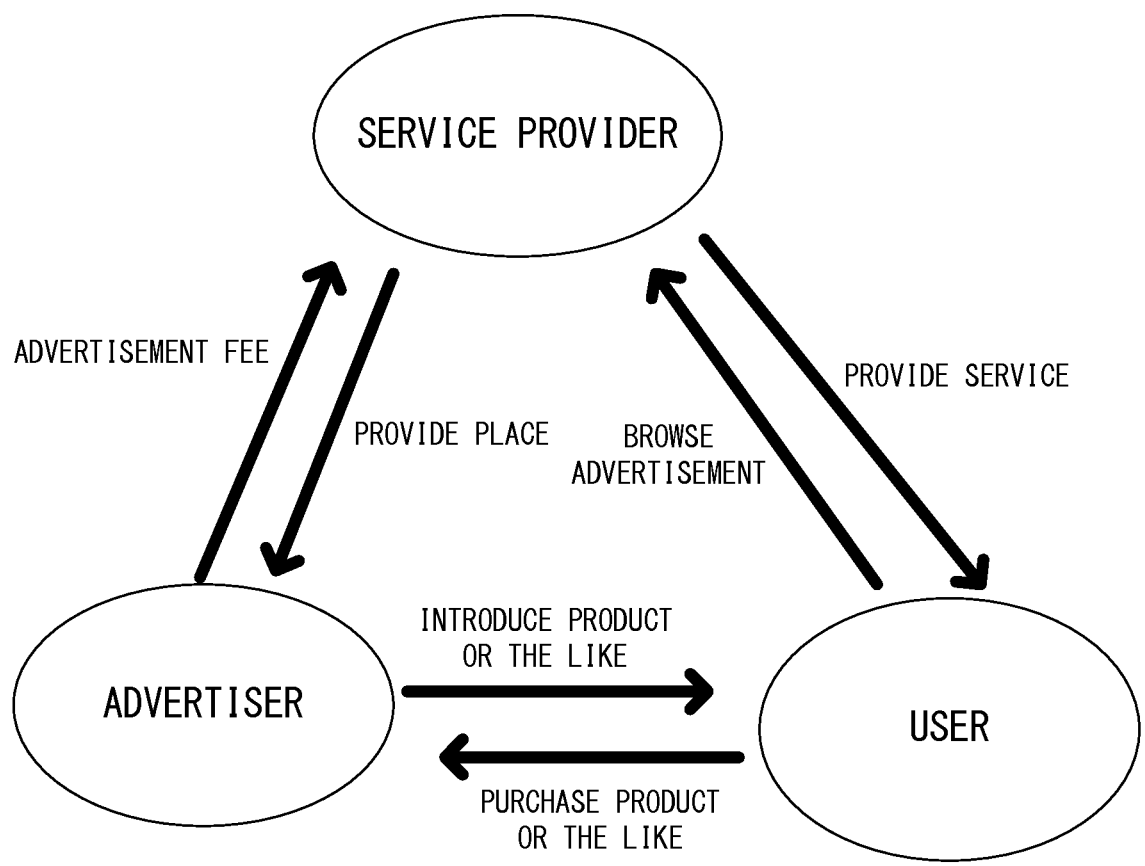
FIG. 4 is a diagram for explaining a non-limiting example of the summary of processing according to the exemplary embodiment.

Next, the summary of operation of information processing executed in the information processing system according to the exemplary embodiment will be described. The exemplary embodiment assumes the case where an advertiser (outside the SNS service) puts an advertisement in the SNS service (which can also be regarded as a closed network) as described above. In this case, it can be said that main operating elements are a service provider (SNS service provider), an advertiser, and a user. Before the summary description of the exemplary embodiment, first, the relationship among these three main elements will be described. FIG. 4 is a diagram for explaining the relationship among these three main elements. In FIG. 4, the service provider provides an SNS service to a user and provides a "place" for advertisement to an advertiser. An advertiser pays the service provider an advertisement fee in compensation for provision of the "space". That is, an advertiser can put an advertisement into a closed community such as an SNS service, by paying an advertisement fee. The advertiser is to introduce its product or the like to a user. In some cases, the advertiser may make a so-called affiliate contract with a user. While utilizing the SNS service, a user browses an advertisement by a method described later. In addition, although also described later in detail, a user can jump to the advertiser's site, based on the advertisement, and then can purchase a product or the like there.

In the above relationship, as the perspective and the desire of each main element, the following are assumed.

(1) Perspective of Service Provider

It is considered that the service provider desires to obtain a lot of advertisement fees and also desires that such an advertisement does not disturb the SNS service (for example, due to occupation of a part of a screen by the advertisement).

(2) Perspective of User

It is considered that, for example, a user desires that the user will see as few advertisements as possible other than a field that the user is interested in. In addition, it is considered that, for example, a user who makes an affiliate contract desires to become an advertising person to obtain a reward.

(3) Perspective of Advertiser

It is considered that an advertiser desires to put an advertisement into a closed community such as the SNS, put an advertisement with high accuracy (advertisement matching user's needs), and further, reduce the cost for preparation of advertisement media such as a banner.

In light of the relationship among these main elements and their perspectives as described above, in the exemplary embodiment, a system that performs the following processing is provided.

(1) First, the service provider presents (sells) a "keyword" as an advertisement medium (hereinafter, referred to as an advertisement keyword) to an advertiser. The advertisement keyword is a word that a user is likely to be interested in or a promising word as an advertisement, such as the title of a movie much talked about at the present or the name of an actor or a character who appears in the movie, the name of a case or an event (e.g., soccer world cup) that is hot at the present, and the name of a trendy good, for example. In addition, a colloquial term or an abbreviated name of such a word can also be used as an advertisement keyword. In addition, the more popular an advertisement keyword is, the higher the price of provision of the keyword is. In another example, a word that is freely selected by an advertiser may be provided (on a yen-per-word basis, for example).

(2) An advertiser selects (purchases) a desired keyword from among advertisement keywords as described above. At this time, the advertiser presents an URL of its own site, or the like to a service provider as necessary.

(3) The service provider stores the purchased advertisement keyword and the site (link destination information) of the advertiser who is the purchaser, such that they are associated with each other.

(4) Users make conversations (post and browse) among the users with use of the SNS service as usual.

(5) If any advertisement keyword is contained in such a conversation (posted text), the SNS server detects this and automatically sets a hyperlink on the advertisement keyword. The link destination thereof is a site of the advertiser who has purchased the advertisement keyword. Also, the display manner for the keyword is changed.

(6) Then, when a user who browses a post that contains such an advertisement keyword performs a selecting operation (an operation by which a user intends to select) such as a tap operation (operation of touching on and then getting off) or a click operation on the advertisement keyword (the position thereof) (hereinafter, such selecting operations are generally referred to as a tap operation), the user can jump to a site of an advertiser associated with this. There, the user can purchase a product or the like relevant to the advertisement keyword or can obtain detailed information about a product. In the case where, for example, an affiliate contract is made between the advertiser and a user, the advertiser can pay (via the SNS provider or the like) an advertisement fee to the user who is the posting person, in accordance with the number of times a tap operation has been performed on this advertisement keyword, for example.

Figure 5:
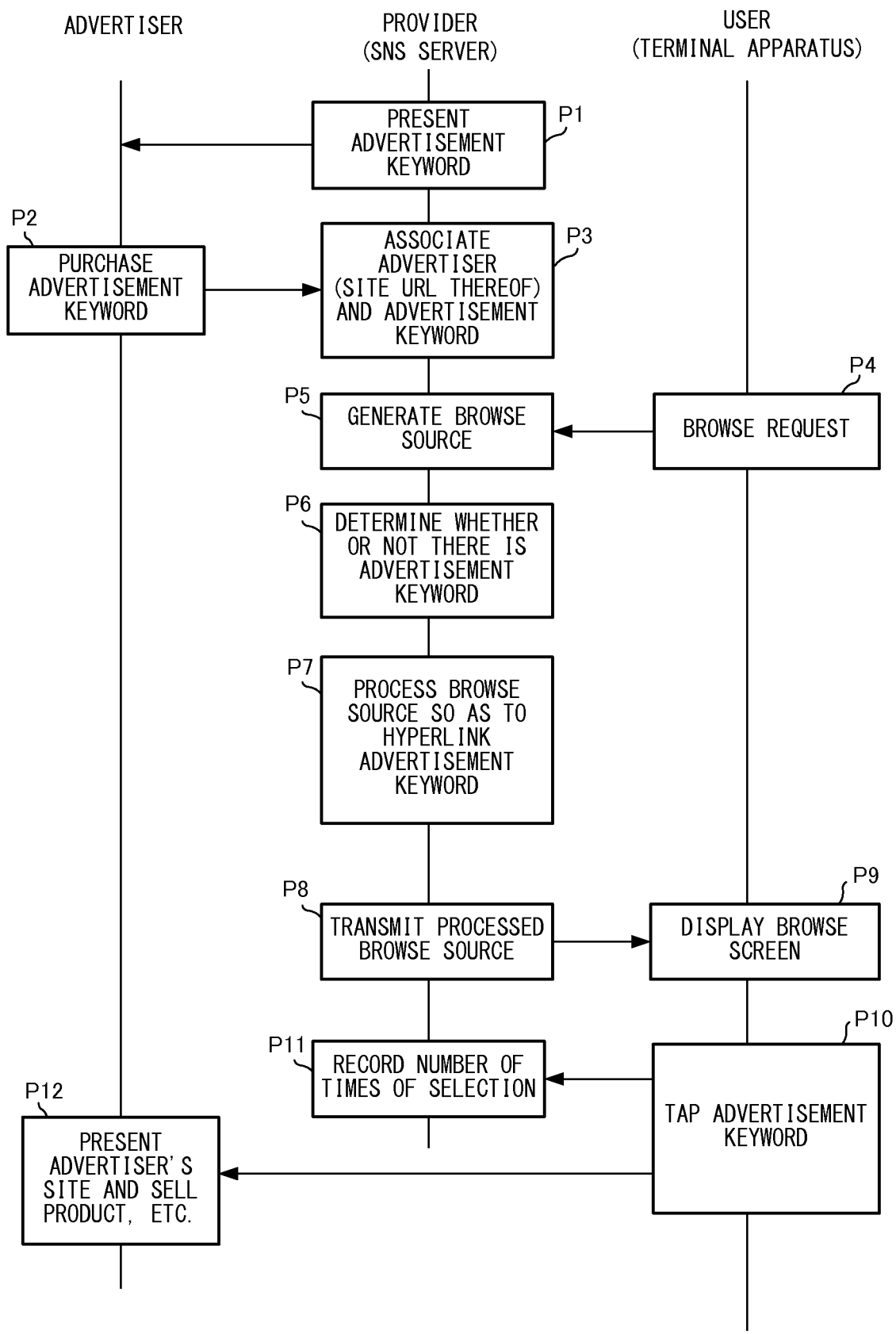
FIG. 5 is a diagram for explaining a non-limiting example of the summary of processing according to the exemplary embodiment.

Supplemental explanation of the flow of the above-described process will be described with reference to FIG. 5. FIG. 5 is a schematic diagram showing, in chronological order in the vertical direction, a non-limiting example of major processings and the flow thereof, performed on the advertiser side, the SNS service provider side, and the user side. First, the provider presents advertisement keywords as described above to an advertiser (P1), and the advertiser purchases a desired advertisement keyword (P2). Regarding the purchase/sale of an advertisement keyword, in the exemplary embodiment, it is assumed that the purchase/sale are performed on the net by using a predetermined purchase/sale system. For example, the provider may provide a site for purchase/sale of advertisement keywords, and an advertiser may access this site to convey intention to purchase a desired advertisement keyword. In another exemplary embodiment, the purchase/sale may not necessarily be performed on the net, but may be performed by an order by telephone or written document. In another exemplary embodiment, instead of the above processings (P1 and P2), for example, processing may be performed in which an advertiser inputs any keyword to place an order therefor.

Nest, after, for example, payment has been performed in the purchase of the advertisement keyword, the provider stores the purchased advertisement keyword and the advertiser (URL of its site) who is the purchaser such that they are associated with each other, in the SNS server 20 (P3).

Next, a user utilizes the SNS service. Here, a "browse request" which is a request for displaying a list of a plurality of posts to browse them is sent from the user's terminal apparatus to the SNS server 20 (P4). In response, the SNS server 20 generates data as a base of a screen (hereinafter, referred to as a browse screen) to be displayed on the terminal apparatus, for example, data written in a markup language such as HTML (it is noted that the format is not limited to a markup language) (P5). Hereinafter, this data is referred to as a browse source.

Next, the SNS server 20 determines whether or not the advertisement keyword is contained in the browse source (in a text to be displayed on the terminal apparatus 10) (that is, detects the advertisement keyword) (P6). Then, if the advertisement keyword is contained in the browse source, the SNS server 20 processes the browse source so as to hyperlink a character string of the advertisement keyword (P7). For example, a part related to the advertisement keyword is sandwiched by HTML tags indicating the hyperlink. As an example, it is assumed that there is a text containing a character string "ΔΔΔΔ" which is an advertisement keyword. In this case, the description "<p>○○○○○ΔΔΔΔ○○○○</p>" in the browse source before change is changed to "<p>○○○○○<a href="xxxxx.html">ΔΔΔΔ<a>○○○○</p>".

In the case where advertisement keywords (either the same keyword or different keywords) as described above are contained at several parts, each keyword is detected and the browse source is processed so as to hyperlink the character strings of the respective advertisement keywords. For example, if there are three advertisement keywords contained, the browse source is to contain the three advertisement keywords that are hyperlinked. In another exemplary embodiment, for example, in the case where a plurality of advertisement keywords contained in the browse source include advertisement keywords that are the same, only one of them (for example, the advertisement keyword that appears first) may be hyperlinked.

Then, the browse source processed as described above is transmitted to the terminal apparatus 10 that is a transmission source of the browse request (P8).

Figure 6:
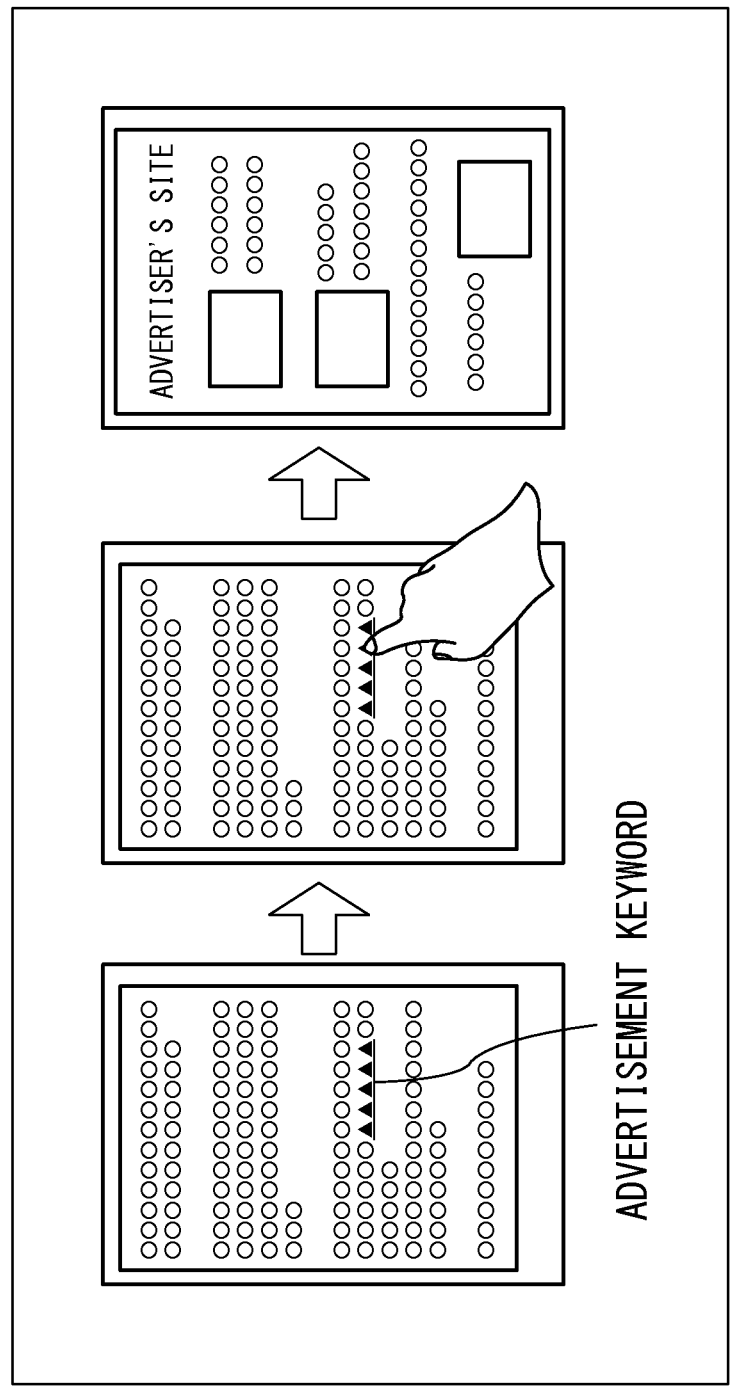
FIG. 6 is a non-limiting example of a screen in the case where an advertisement keyword has one link destination.

The terminal apparatus 10 generates and displays a browse screen based on the browse source (P9). Then, when the user performs a tap operation on the advertisement keyword (P10), the user can jump to a site of the advertiser associated therewith (P12). In addition, at this time, information indicating that a tap operation has been performed on the advertisement keyword is transmitted to the SNS server 20 (P11). FIG. 6 is a non-limiting example of a screen transition and operation in the terminal apparatus 10 here. A leftmost screen example in FIG. 6 shows a browse screen, and "ΔΔΔΔΔ" which is the advertisement keyword is contained in this screen. In this screen example, in order to facilitate visual recognition that a link is set for the advertisement keyword, the display manner is changed such that a character color of the advertisement keyword is changed and the advertisement keyword is underlined. Then, when the user performs a tap operation on the advertisement keyword, information indicating that a tap operation has been performed on the advertisement keyword is transmitted to the SNS server 20, and the screen jumps to a site of the advertiser for which the hyperlink is set, and as a result, the site of the advertiser is displayed on the screen of the terminal apparatus 10.

The system as described above brings the following benefits to the above respective main elements. First, the service provider can utilize a part (in other words, one of elements to be displayed on a browse screen) of a text contained in a post content, as an advertisement medium, and therefore does not need to secure, for advertisement display, a part of a narrow screen like a smartphone, for example. As a result, the service provider can obtain advertisement income without hampering provision of the SNS service (that is, without reducing usability for users).

In addition, the user does not suffer discomfort such as difficulty in viewing a screen due to occupation of a part of the screen by advertisement display. In addition, in the case where the user makes an affiliate contract, the user can obtain income by the affiliate merely by performing conversations (post and browse) in the SNS as usual.

In addition, the advertiser can put an advertisement into a closed community such as an SNS. Particularly, it is possible to put an advertisement into a place where users who are comparatively interested in the advertisement content gather, so that the advertiser can further efficiently put an advertisement (for example, purchase an advertisement keyword relevant to a movie to put an advertisement into a community whose main topic is about movie). In addition, it is possible to put an advertisement merely by selecting a desired keyword from among advertisement keywords (i.e., advertisement media) prepared in advance (by the service provider) without creating and preparing an advertisement banner or the like separately, for example.

Figure 7:
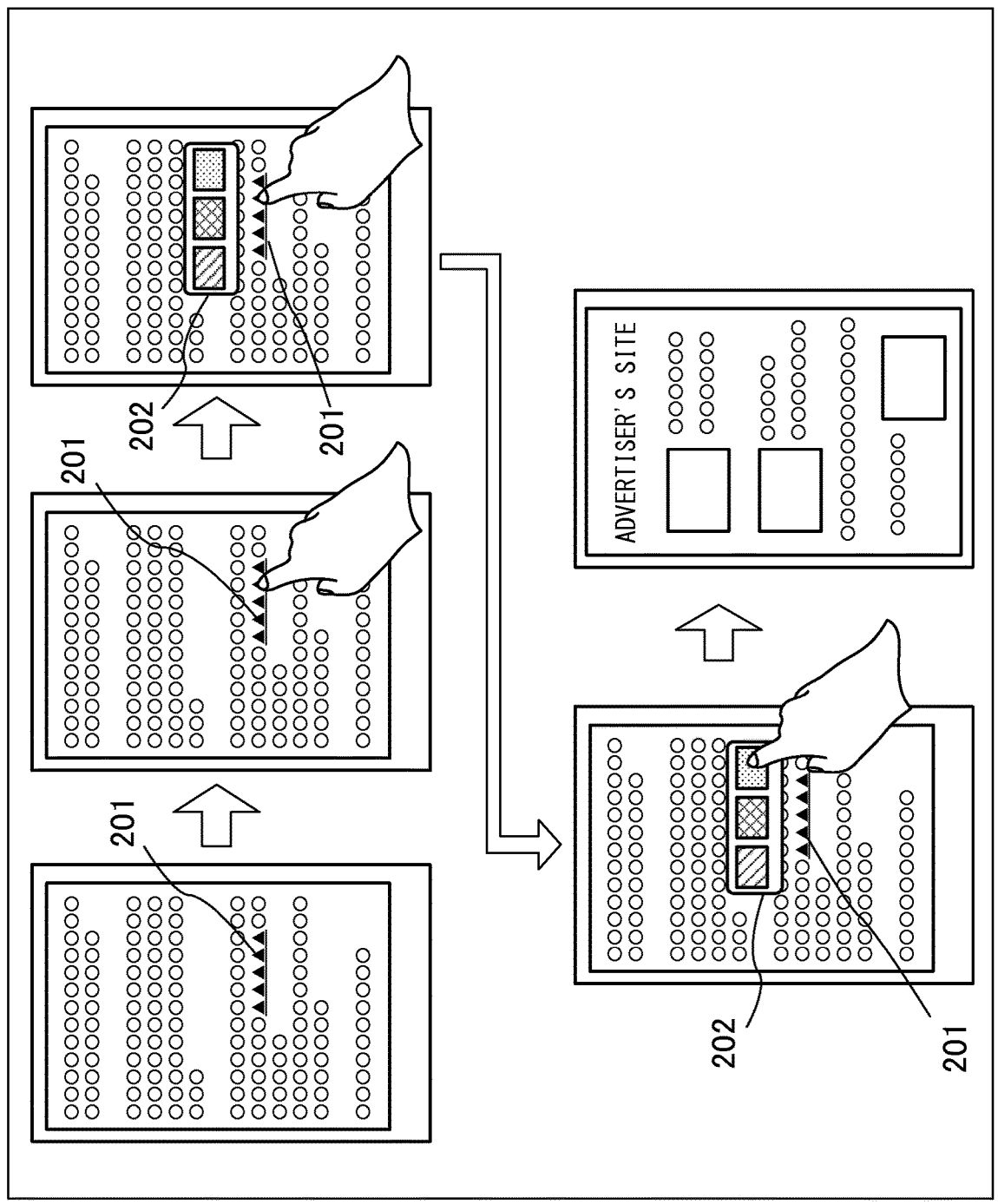
FIG. 7 is a non-limiting example of a screen in the case where an advertisement keyword has a plurality of link destinations.

In the above, the case where one advertiser's site is linked on one advertisement keyword is shown as an example. However, in the exemplary embodiment, it is also possible to associate a plurality of advertisers with one advertisement keyword. That is, one advertisement keyword can be sold to a plurality of advertisers. FIG. 7 shows a non-limiting example of a screen on the terminal apparatus 10 in this case. In FIG. 7, it is assumed that three advertisers' sites are associated with "ΔΔΔΔΔ" which is an advertisement keyword 201, for example. In this case, when a user performs a tap operation on the advertisement keyword 201, a thumbnail 202 is pop-up displayed near the advertisement keyword 201. This thumbnail 202 displays images (hereinafter, referred to as advertisement images) respectively indicating three advertisers' sites, so as to be arranged along the horizontal direction. These images may be a symbol mark of each advertiser, a reduced image of a site at each link destination, or a so-called banner for advertisement, for example. In addition, here, it is assumed that no matter which advertiser each image belongs to, the sizes of the advertisement images are a fixed size (that is, advertisement images of any advertisers have the same image size). When the user further performs a tap operation on one of the advertisement images in the thumbnail 202, the user can jump to the corresponding advertiser's site.

Regarding the operation in the case where a plurality of advertisers are associated with one advertisement keyword as described above, when a tap operation is performed on the advertisement keyword, the thumbnail 202 may be displayed, and when an operation of double tapping the advertisement keyword or an operation of pressing and holding the advertisement keyword is performed, the screen may jump to one of the advertisers' sites associated with the advertisement keyword, without displaying the thumbnail 202 (for example, the screen may jump to the advertiser's site set as a default as described later). That is, in this case, a tap operation can be considered to be a "normal selecting operation" and a double tap operation or a press and hold operation can be considered to be a "deciding operation" indicating further strong intention. When a "normal selecting operation" is performed for an advertisement keyword, the thumbnail 202 is displayed, and when a "deciding operation" is performed, the screen directly jumps to an advertiser's site at this point of time.

Here, in the case of displaying such a thumbnail 202, as a description in a markup language, for example, it is conceivable to write the total number of link destinations and the plurality of link destinations (URL or the like). The following is an example of the description method. In this example, an imaginary tag "HREFTBL" is used.

<HREFTBL>ΔΔΔΔΔ<number of link elements><link destination 1><link destination 2> . . . <link destination n><advertisement image data name 1><advertisement image data name 2> . . . <advertisement image data name n></HREFTBL>

(It is noted that <advertisement image data name n> is written as a full path indicating its storage location, for example.)

A rendering engine (e.g., HTML rendering engine) of each terminal may be configured to interpret the above description such that the above thumbnail is to be displayed. The above tags and the like are merely an example. Any description method may be used as long as the operation as shown in the above screen example is realized. That is, not only the above example, but any description method may be used as long as it is possible to generate such a document that, on the screen, only a character string such as an advertisement keyword is displayed, and when a predetermined operation such as a tap operation is performed on the character string, the screen jumps to at least one link destination associated with the character string or the screen jumps to the one selected from among a plurality of link destinations.

In the case where a browse source containing a description using the "HREFTBL" tag is stored into the memory of the terminal apparatus 10, it can be considered that data having a data structure in which a plurality of information pieces indicating link destinations and advertisement images (or elements indicating them) corresponding to the respective information pieces are associated with a specific character string like the above advertisement keyword is stored into the memory of the terminal apparatus 10. In another exemplary embodiment, such data having a data structure in which a plurality of information pieces indicating link destinations and advertisement images (or elements indicating them) corresponding to the respective information pieces are associated with a specific character string like the above advertisement keyword may be stored into the SNS server 20, and the "HREFTBL" tag may be written so as to indicate the storage location of this data. Then, when rendering this tag, the terminal apparatus 10 may access the SNS server 20, and may generate and display the above thumbnail 202 by referring to the data present at the storage location indicated by the "HREFTBL".

Regarding the operation and behavior relevant to display of the thumbnail 202, in another exemplary embodiment, the thumbnail 202 may be displayed by press-and-hold operation on an advertisement keyword, for example. Then, when the touching finger is moved onto an image indicating one of link destinations on the thumbnail 202 (slide operation) and then taken off there, jumping to the link destination may be performed. In addition, in the case where thumbnail display is performed by such a press-and-hold operation, when merely a tap operation is performed on an advertisement keyword instead of a press-and-hold operation, the screen may jump to, for example, a link destination that is set first, which may be defined as a default jumping destination, among the link destinations displayed on the thumbnail 202. Alternatively, the screen may jump to another one of the link destinations, that is separately defined as a default jumping destination. In this case, for example, an element indicating a default link destination may be interposed after the element group indicating the link destinations, as shown below.

<HREFTBL>ΔΔΔΔΔ<number of link elements><link destination 1><link destination 2> . . . <link destination n><default link destination><advertisement image data name 1> . . . </HREFTBL>

In another exemplary embodiment, when a tap operation is performed on the advertisement keyword, the thumbnail 202 may be displayed, and when an operation of double tapping the advertisement keyword or an operation of pressing and holding the advertisement keyword is performed, the screen may jump to one of the advertisers' sites associated with the advertisement keyword, without displaying the thumbnail 202 (for example, the screen may jump to a default link destination as described above). That is, in this case, a tap operation can be considered to be a "normal selecting operation" and a double tap operation or a press and hold operation can be considered to be a "deciding operation" indicating further strong intention. When a "normal selecting operation" is performed for an advertisement keyword, the thumbnail 202 is displayed, and when a "deciding operation" is performed, the screen directly jumps to an advertiser's site at this point of time.

In addition, display manners for an advertisement keyword having only one link destination and an advertisement keyword having a plurality of link destinations as described above may be different from each other. For example, an advertisement keyword having only one link destination may be displayed in an underlined manner, and an advertisement keyword having a plurality of link destinations may be displayed in bold font. Alternatively, an advertisement keyword having only one link destination and an advertisement keyword having a plurality of link destinations may be displayed using respective font colors different from each other.

In the case where a plurality of link destinations are set, the display position, the display order, or the arrangement of advertisement images indicating the link destinations in the thumbnail 202 may be allowed to be designated by a description of <HREFTBL> shown above, for example.

In another exemplary embodiment, after a top operation is performed on one of the (plurality of) advertisement images, the other advertisement images (that have not been tapped) may be still displayed at the advertiser's site that is the jumping destination.

Next, with reference to FIGS. 8 to 20, the operation of the information processing system in the exemplary embodiment will be described in more detail. First, data used in the present system will be described.

Figures 8, 9, 10:
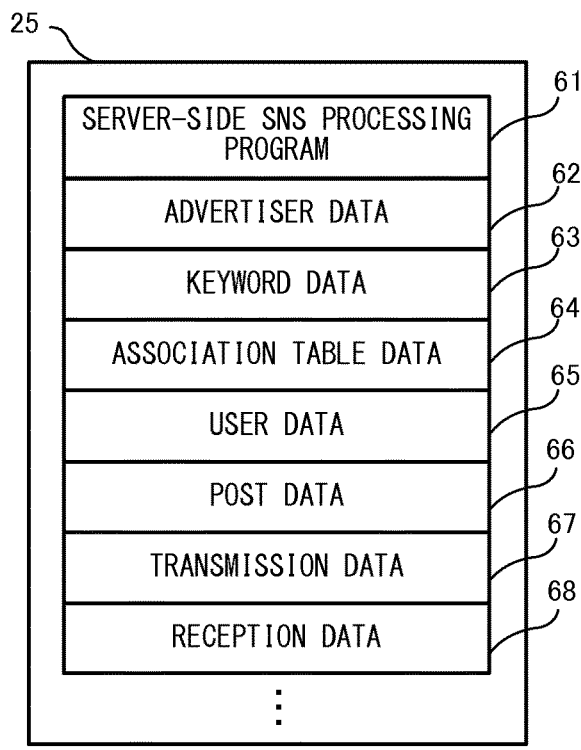
FIG. 8 is a diagram showing a non-limiting example of a program and information stored in a main memory 25 of the server 20.
FIG. 9 is a non-limiting example of the data structure of advertiser data 62.
FIG. 10 is a non-limiting example of the data structure of keyword data 63.

FIG. 9 is a diagram showing a non-limiting example of a program and information stored in the main memory 25 of the SNS server 20. The main memory 25 stores a server-side SNS processing program 61, advertiser data 62, keyword data 63, association table data 64, user data 65, post data 66, transmission data 67, reception data 68, and the like.

The server-side SNS processing program 61 is a program for realizing a function (SNS server process) on the SNS server 20 side in the SNS according to the exemplary embodiment.

The advertiser data 62 is data relevant to an advertiser. FIG. 9 is a diagram showing a non-limiting example of the structure of the advertiser data 62. In FIG. 9, the advertiser data 62 is data having a table structure composed of a collection of records each including an advertiser ID 70, link destination data 71, and other information 72. The advertiser ID 70 is an ID for uniquely identifying each advertiser in the system. The link destination data 71 is data indicating a site of each advertiser which is set so as to be associated with the corresponding advertisement keyword. For example, this data is URL or the like of the advertiser's site. The other information 72 contains information about the name, the address, etc. of each advertiser, information relevant to payment of each advertiser (information about whether or not payment has been finished), information relevant to affiliate, and the like.

In the exemplary embodiment, for simplification of the description, the case where one advertiser has one site (link destination) and one advertisement keyword is associated with this one site, will be described as an example. Instead of the above association way, in another exemplary embodiment, one advertiser may have a plurality of sites (link destinations), and may be allowed to make an order (purchase) for associating the plurality of sites with the one advertisement keyword. For example, a site A, a site B, and a site C (all of which are sites of the same advertiser) may be associated with a certain keyword "ΔΔΔ". In this case, it can be assumed that there are three orders for the keyword "ΔΔΔ". Then, for example, an ID such as "order ID" may be generated for each order, and may be included in the advertiser data 62. In the above example, three order IDs are generated, and one of the three link destinations is specified by a combination of the advertiser ID 70 and the order ID. For example, it is assumed that the advertiser ID is "ABC" and the order IDs are "01", "02", and "03". In this case, the link destination to the site A can be specified by "ABC01", the link destination to the site B can be specified by "ABC02", and the link destination to the site C can be specified by "ABC03". As a matter of course, instead of this data structure, any data structure (database structure) may be used as long as the above-described configuration can be realized.

Returning to FIG. 8, the keyword data 63 is data relevant to the advertisement keywords. FIG. 10 is a non-limiting example of the structure of the keyword data 63. The keyword data 63 is data having a table structure composed of a collection of records each including advertisement keyword data 74, an association table ID 75, purchase/sale data 76, and the like. The advertisement keyword data 74 is data indicating a specific word (character string) of each advertisement keyword as described above. The association table ID 75 is an ID for specifying an association table 78 described later. The purchase/sale data 76 is information relevant to purchase/sale of each advertisement keyword, and includes data indicating a price, a sale period, and the like, for example.

In another exemplary embodiment, also a character string considered to be equivalent to the advertisement keyword, such as an abbreviated name or another name of the advertisement keyword, may be included in the keyword data 63 such that the character string is associated with the advertisement keyword. Then, such an abbreviated name or another name may also be included in targets of the "determination about whether or not the advertisement keyword is contained" as described above. In the exemplary embodiment, for simplification of the description, it is assumed that each advertisement keyword does not have such an abbreviated name or another name.

Figure 11:
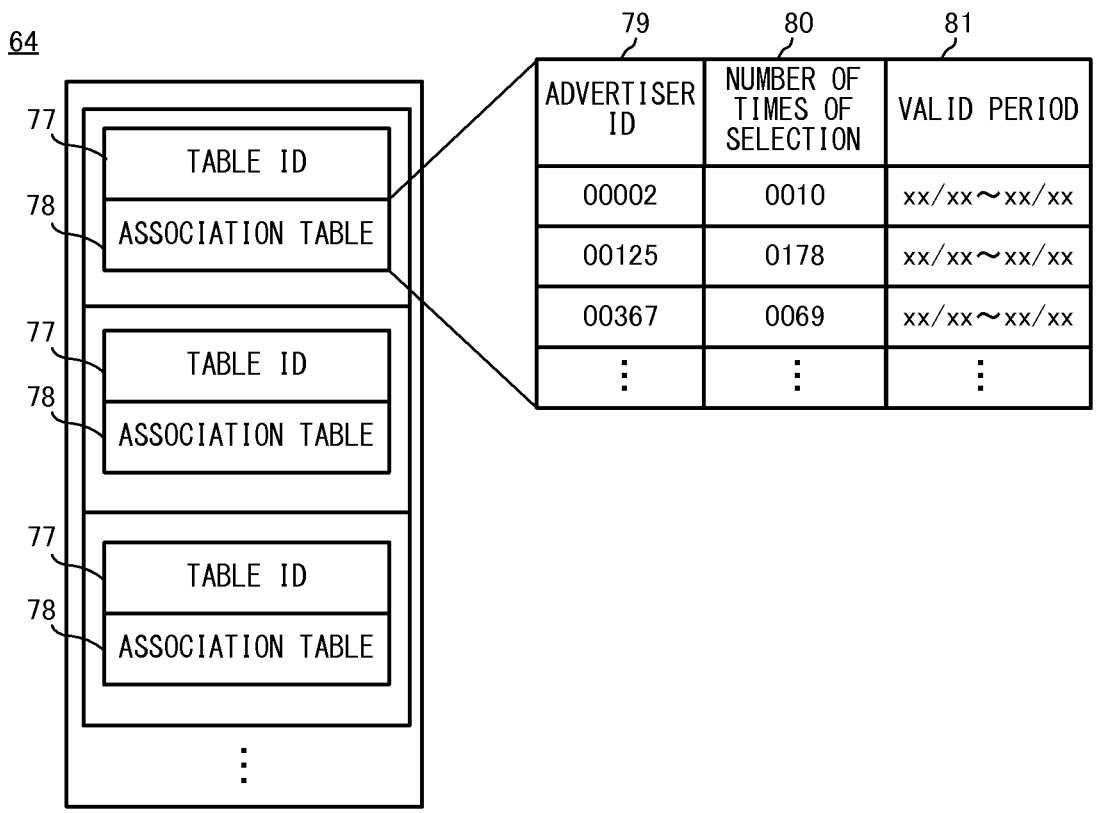
FIG. 11 is a non-limiting example of the data structure of association table data 64.

Returning to FIG. 8, the association table data 64 is data indicating association between each advertisement keyword and an advertiser (who has purchased the advertisement keyword). FIG. 11 is a diagram showing a non-limiting example of the structure of the association table data 64. The association table data 64 is composed of a collection of records each including a combination of a table ID 77 and an association table 78. The table ID 77 is an ID for uniquely identifying each association table. In the exemplary embodiment, the table ID 77 is specified by the association table ID 75 of the keyword data 63, whereby the association table data 64 and the advertisement keyword are associated with each other. The association table 78 is data relevant to an advertiser who has purchased an advertisement keyword associated with this table, and the like. Specifically, the association table 78 is table data composed of a collection of records each including an advertiser ID 79, the number of times of selection 80, and a valid period 81. The advertiser ID 79 is an ID for specifying an advertiser who has purchased an advertisement keyword associated with each table.

The number of times of selection 80 is data indicating the number of times a tap operation has been performed on each advertisement keyword in the case where there is only one advertiser associated with the advertisement keyword (in the case where the thumbnail 202 is not displayed). In addition, in the case where a plurality of advertisers are associated, that is, in the case where the thumbnail 202 is displayed, the number of times of selection 80 is data indicating the number of times a tap operation (i.e., selection) has been performed on each advertisement image contained in the thumbnail 202. In addition, by calculating the total number of the numbers of times of selection 80, the total number of times a tap operation has been performed on the advertisement keyword associated with this association table 78 can be calculated. That is, whether only one advertiser is associated or a plurality of advertisers are associated, not only the number of times of selection for each advertiser but also the number of times of selection for each advertisement keyword can be calculated as necessary.

Next, the valid period 81 is data indicating how long the association between each advertiser and the corresponding advertisement keyword is to be maintained, and is determined based on the content of a contract made when the advertisement keyword has been purchased, for example.

Figure 12:
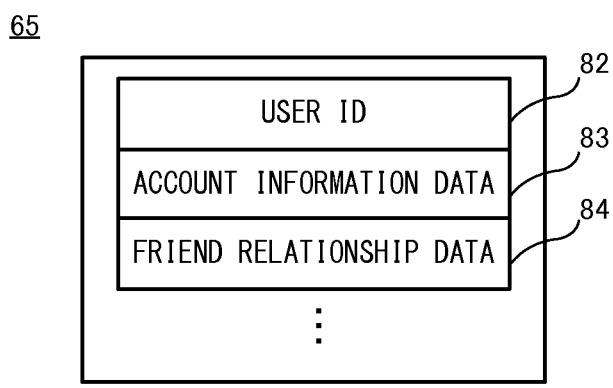
FIG. 12 is a non-limiting example of the data structure of user data 65.

Returning to FIG. 8, the user data 65 is data having recorded therein information relevant to users utilizing the SNS in the exemplary embodiment. FIG. 12 is a diagram showing a non-limiting example of the data structure of the user data 65. The user data 65 includes a user ID 82, account information data 83, friend relationship data 84, and the like. The user ID 82 is an ID for uniquely identifying each user. The account information data 83 is data indicating each user's account, profile, etc., such as login ID, password, name, age, hobby, hometown, old school, and the like of each user, for example. Besides, for example, data used in processing relevant to affiliate may be included in the user data 65. For example, data indicating, for each advertisement keyword, the number of times a tap operation has been performed on each advertisement keyword contained in a post such as an article posted by each user may be included in the user data 65. That is, the number of times of tap operations on each advertisement keyword may be counted for each of users who have posted articles containing the advertisement keyword, and may be recorded in the user data 65 (advertisement income that each user can obtain varies in accordance with this number of times).

Figure 13:
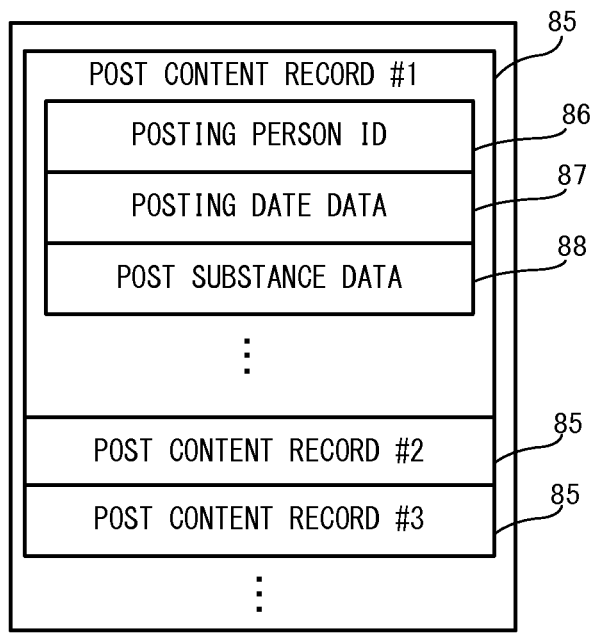
FIG. 13 is a non-limiting example of the data structure of post data 66.

Returning to FIG. 8, the post data 66 is data indicating a post content transmitted to the SNS server 20 as described above. FIG. 13 is a diagram showing a non-limiting example of the data structure of the post data 66. The post data 66 contains a plurality of post content records 85, and each post content record 85 is composed of a posting person ID 86, posting date data 87, post substance data 88, and the like. The posting person ID 86 indicates a user ID 82 of a user who has posted the post content. The posting date data 87 indicates a date when the post content has been posted. The post substance data 88 is data indicating the post content itself, and can also be considered to be a main body of the post content, such as text data or image data.

The above table structure is merely an example. Another table data structure may be used as long as the data structure can indicate an equivalent content as shown above.

Returning to FIG. 8, the transmission data 67 is data to be transmitted to the terminal apparatus 10, and contains a browse source and the like, for example. The reception data 68 is data received from the terminal apparatus 10, and contains data relevant to a post, a browse request, data indicating an operation or a browse action performed on the terminal apparatus 10, and the like, for example.

Figure 14:
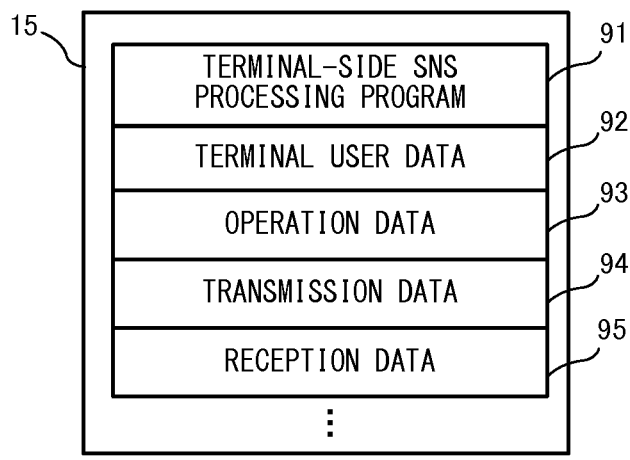
FIG. 14 is a diagram showing a non-limiting example of a program and information stored in a main memory 15 of the terminal apparatus 10.

Next, data used in the terminal apparatus 10 will be described. FIG. 14 is a diagram showing a non-limiting example of a program and information stored in the main memory 15 of the terminal apparatus 10. In the main memory 15, a terminal-side SNS processing program 91, terminal user data 92, operation data 93, transmission data 94, reception data 95, and the like are stored.

The terminal-side SNS processing program 91 is a program for realizing a function (SNS client process) on the terminal apparatus 10 side in the SNS in the exemplary embodiment.

The terminal user data 92 is data relevant to a user utilizing the SNS process on the terminal apparatus. In the terminal user data 92, mainly, data or the like for identifying a posting person and the like on the server side, for example, the same data as in the case of the user ID 82, is stored. The operation data 93 is data indicating the contents of various operations performed on the terminal apparatus 10. For example, the operation data 93 includes data indicating the coordinates (the coordinates on the screen) on the touch panel at which a tap operation is performed, or the like.

The transmission data 94 is data to be transmitted to the SNS server 20. The transmission data 94 is generated based on the terminal user data 92, the operation data 93, and the like, and contains, for example, data indicating a user ID and a post content of the user, a browse request, and an operation content such as a tap operation, and the like. For example, the transmission data 94 is formed by a header section and a body section. The header section indicates a user ID and the kind of the transmission data (post, browse request, etc.), and the body section indicates the content thereof (text, picture data, etc. in the case of post). The reception data 95 is various data received from the SNS server 20, and for example, contains the browse source and the like.

Besides, in the main memory 15, various data used in processing by the terminal apparatus 10 (for example, data for temporarily storing a post content before transmission) are also stored as appropriate.

Next, with reference to flowcharts in FIGS. 15 to 20, the flows of processes executed by the SNS server 20 and the terminal apparatus 10 in the exemplary embodiment will be described.

First, processing by the SNS server 20 will be described. In the exemplary embodiment, the SNS server 20 mainly performs the following two processes. The first process is a process relevant to registration of an advertisement keyword (hereinafter, a keyword registration process). The second process is a process relevant to communication with the terminal apparatus 10 (hereinafter, an SNS process). Hereinafter, the process relevant to registration of an advertisement keyword will be described first, and then the process relevant to communication with the terminal apparatus 10 will be described.

Figure 15:
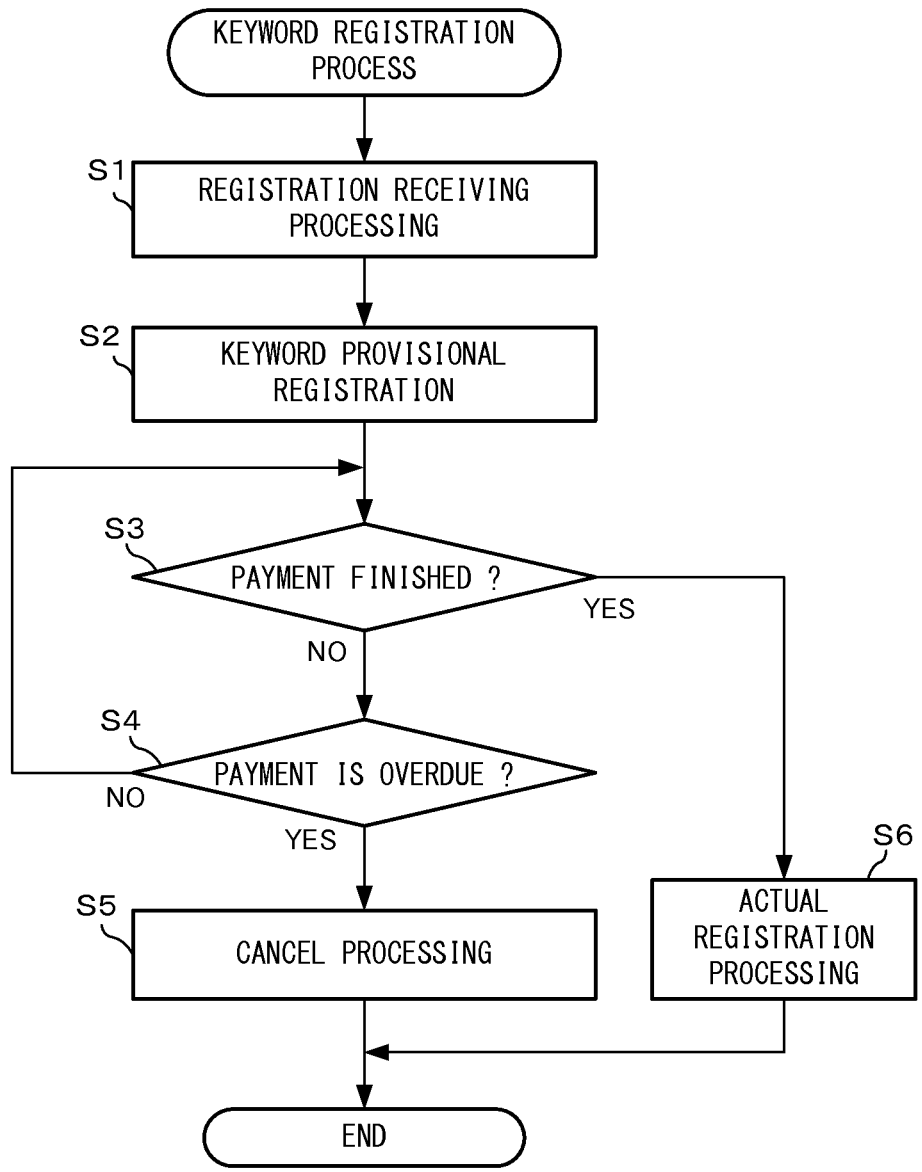
FIG. 15 is a flowchart showing a non-limiting example of the details of a keyword registration process by an SNS server.

FIG. 15 is a flowchart showing a non-limiting example of the details of the keyword registration process executed by the SNS server 20. In this process, processings for registering an advertisement keyword purchased by an advertiser are executed. In FIG. 15, first, in step S1, the CPU 23 executes registration receiving processing for receiving a registration request from an advertiser. Here, for example, it is assumed that an advertiser accesses a site for selling advertisement keywords prepared by a provider in advance, and then performs a "purchase order" for a desired keyword. As an example, it is assumed that, from a plurality of advertisement keywords presented at the site, an advertiser selects one desired advertisement keyword, writes predetermined matters (the advertiser's desire such as the link destination URL or an advertisement valid period, and the like), and transmits a "purchase order" to the provider. Reception of this "purchase order" corresponds to the registration receiving processing.

Next, in step S2, the CPU 23 executes provisional registration processing for the advertisement keyword. Since at the stage of the above registration receiving processing, payment has not been performed yet, the registration is still treated as provisional registration at this point of time. For example, based on the data of "purchase order" that has been received, the CPU 23 generates data for the new advertiser in the advertiser data 62 (newly assigns an advertiser ID, and the like), or if the advertiser has already existed, searches for the corresponding data. Then, the CPU 23 performs registration in the link destination data 71 as necessary, and stores information indicating "waiting for payment", in the other information 72.

Next, in step S3, the CPU 23 determines whether or not a purchase fee for the advertisement keyword has been paid, that is, whether or not the payment has been completed. For example, an operator of the SNS server 20 inputs information indicating that payment of the fee has been completed, or a predetermined payment system transmits such information to the SNS server 20, whereby it is determined that the payment has been completed.

As a result of the determination in step S3, if the payment has been completed (YES in step S3), actual registration processing is executed in step S6. Specifically, processing of searching for the association table 78 corresponding to the purchased advertisement keyword, and adding an advertiser ID 79 indicating the advertiser who has purchased and a valid period 81, is executed. In addition, the number of times of selection 80 is set at 0. In addition, information indicating that payment has been completed is set in the other information 72. Thus, the keyword registration process is ended.

On the other hand, as a result of the determination in step S3, if payment has not been completed yet (NO in step S3), next, in step S4, the CPU 23 determines whether or not payment is overdue. As a result, if payment is not overdue (NO in step S4), the process returns to step S3 to repeat the processing. On the other hand, if payment is overdue (YES in step S4), in step S5, the CPU 23 executes cancel processing. That is, processing for cancelling the purchase order is executed as appropriate. Thus, the keyword registration process is ended.

In another exemplary embodiment, without the keyword provisional registration processing (without waiting for payment), the association between an advertisement keyword and an advertiser's link destination may be executed in accordance with a request from the advertiser. In still another exemplary embodiment, the above processing may be manually performed. That is, an operator of the SNS server 20 may manually perform input of information such as a link destination of an advertiser or an operation of recording association of an advertisement keyword in the SNS server 20.

Figure 16:
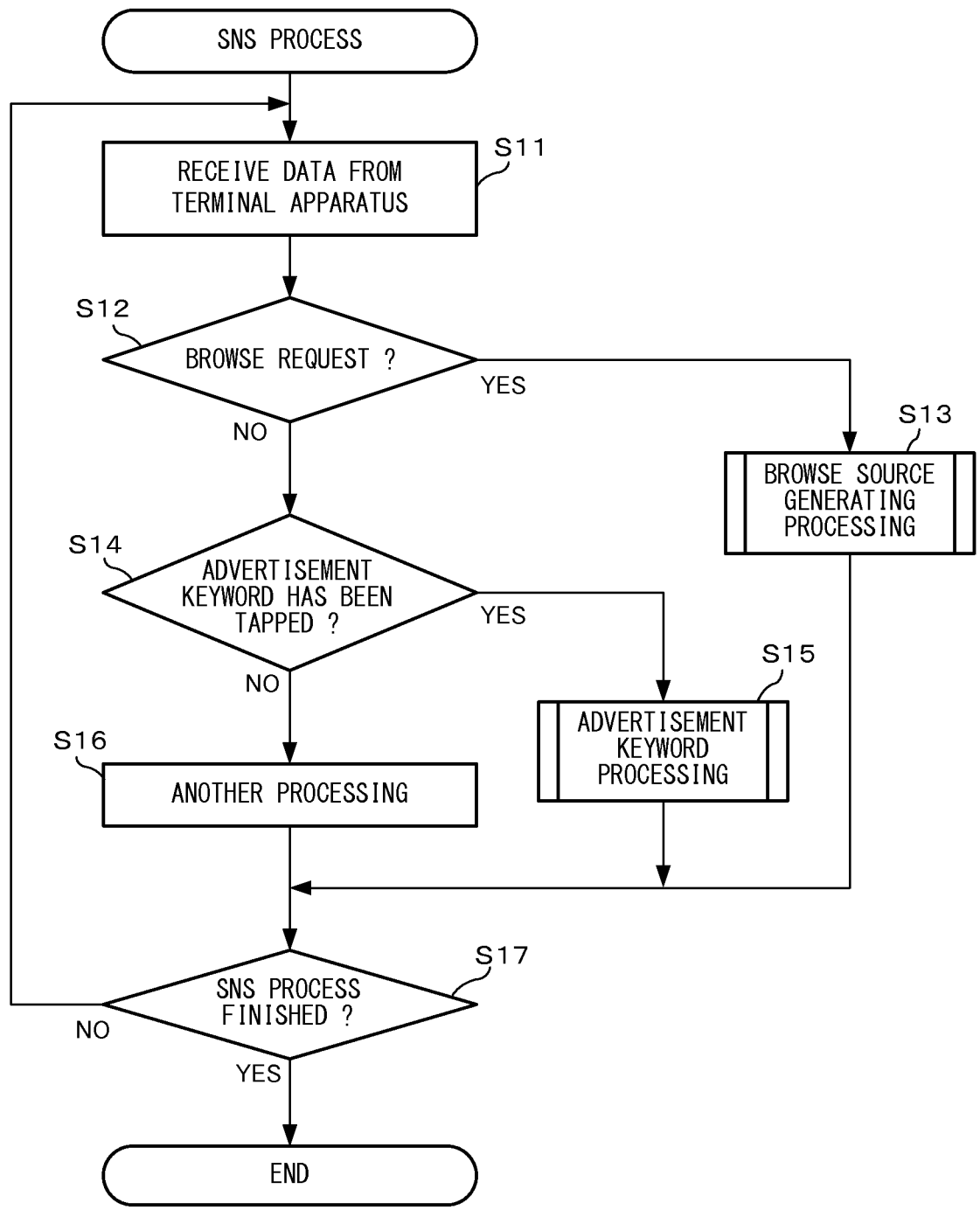
FIG. 16 is a flowchart showing a non-limiting example of the details of an SNS process by the SNS server.

Next, with reference to FIGS. 16 to 18, the details of the SNS process which is a process relevant to communication with the terminal apparatus 10 will be described. In FIG. 16, first, in step S11, the CPU 23 receives transmission data 94 transmitted from the terminal apparatus 10, and stores the transmission data 94 as reception data 68. Next, in step S12, the CPU 23 determines whether or not the content of the reception data 68 is "browse request". As a result, if the content of the reception data 68 is "browse request" (YES in step S12), in step S13, the CPU 23 executes a browse source generating process.

Figure 17:
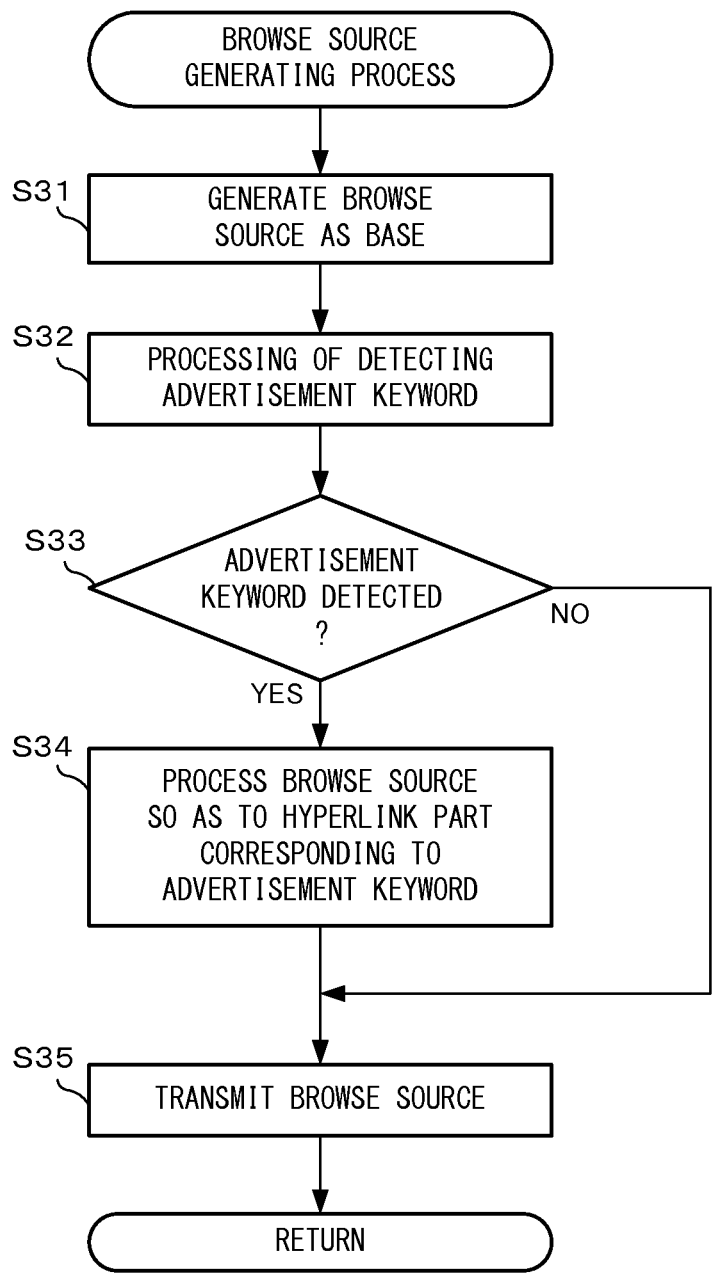
FIG. 17 is a flowchart showing a non-limiting example of the details of processing in step S13 in FIG. 16.

FIG. 17 is a flowchart showing a non-limiting example of the details of the browse source generating process. First, in step S31, the CPU 23 extracts predetermined post substance data 88 from one or more post data 66, based on the received "browse request", and generates a browse source that contains the extracted post substance data 88. Next, in step S32, the CPU 23 executes, for the browse source, processing of detecting a character string as an advertisement keyword, using the keyword data 63. Next, in step S33, the CPU 23 determines whether or not at least one advertisement keyword is contained as a result of the detection. As a result, if no advertisement keyword has been detected (NO in step S33), the process proceeds to step S35 described later.

On the other hand, if an advertisement keyword has been detected (YES in step S33), next, in step S34, the CPU 23 executes processing for hyperlinking the advertisement keyword (in the case where a plurality of advertisement keywords have been detected, hyperlinking each of them). Specifically, the CPU 23 refers to the keyword data 63 and the association table data 64 and determines whether or not there are a plurality of advertisers associated with each advertisement keyword. Then, if there is only one such advertiser, the CPU 23 modifies the browse source so as to set a link destination of the advertiser on the corresponding advertisement keyword. On the other hand, if there are a plurality of such advertisers, the CPU 23 makes setting for the corresponding advertisement keyword so that the thumbnail 202 as shown in FIG. 7 will be displayed. For example, if there is one such advertiser, modification is performed such that an HTML tag "href" as described above is attached to the corresponding advertisement keyword, and if there are a plurality of such advertisers, processing of calculating the number of the advertisers and changing the description into the one using a tag "HREFTBL" as described above is performed. In addition, at this time, processing of changing the display manner for the advertisement keyword may be performed. For example, the display manner may be changed by providing an underline so as to be distinguishable from character strings other than an advertisement keyword. In addition, the browse source may be processed so as to change the font color so that the case where a single advertiser is associated and the case where a plurality of advertisers are associated can be distinguished from each other, as described above. In addition, at this time, for example, by referring to the association table 78 corresponding to the advertisement keyword, the CPU 23 may determine whether or not to contain a link destination of each advertiser, based on the valid period 81. For example, a link destination of an advertiser for whom a valid period has expired may not be contained in the description of the "HREFTBL" tag.

In another exemplary embodiment, the description order of advertisement images of respective advertisers defined by "HREFTBL" may be dynamically changed. For example, under the assumption that the display positions of the advertisement images in the thumbnail 202 are determined based on the order of link destinations described in the "HREFTBL", the terminal apparatus 10 may change the order of link destinations of the respective advertisers described in the "HREFTBL" tag, based on the numbers of times of selection 80 of the respective advertisers. For example, a link destination of an advertiser who is often selected may be written first as <link destination 1>, or conversely, a link destination of an advertiser who is not often selected may be written first as <link destination 1>.

In another exemplary embodiment, in the case where there are a plurality of advertisers associated, instead of using the thumbnail 202, one of the sites of the plurality of advertisers may be randomly selected and displayed when the advertisement keyword is tapped.

Next, in step S35, the CPU 23 executes transmission of the browse source to the terminal apparatus 10 that is the request source. In the case where an advertisement keyword has been detected in step S33, the browse source that has been processed as described above is transmitted. Thus, the browse source generating process is ended.

In another exemplary embodiment, for example, when post substance data 88 is extracted from the post data 66, whether or not an advertisement keyword is contained in the extracted post substance data 88 may be determined at the same time, and a browse source in which a link destination of an advertiser is set on each advertisement keyword may be generated from the very beginning.

Returning to FIG. 16, as a result of the determination in step S12, if the reception data 68 is not "browse request" (NO in step S12), next, in step S14, the CPU 23 determines whether or not the content of the reception data 68 indicates that a tap operation has been performed on an advertisement keyword on the terminal apparatus 10. In the case where the thumbnail 202 is displayed (a plurality of advertisers are associated with one advertisement keyword), selection (tap operation) of one of the link destination images in the thumbnail 202 corresponds to the content indicating that a tap operation has been performed on an advertisement keyword. As a result of the determination, if the content of the reception data 68 indicates that a tap operation has been performed on an advertisement keyword (YES in step S14), in step S15, the CPU 23 executes an advertisement keyword process.

Figure 18:
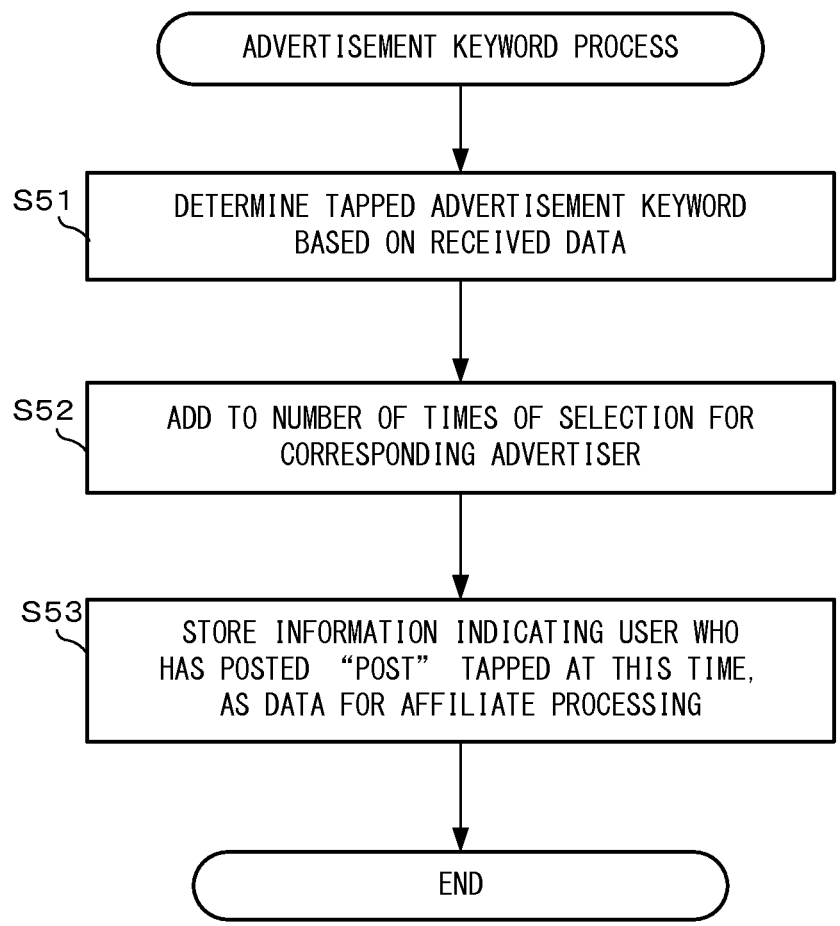
FIG. 18 is a flowchart showing a non-limiting example of the details of processing in step S15 in FIG. 16.

FIG. 18 is a flowchart showing a non-limiting example of the details of the advertisement keyword process. First, in step S51, based on the reception data 68, the CPU 23 determines (specifies) an advertisement keyword on which the tap operation has been performed in the terminal apparatus 10. In the case where there is a single advertiser associated with the advertisement keyword, the advertiser is also specified. In the case where there are a plurality of advertisers associated with the advertisement keyword, that is, the thumbnail 202 (see FIG. 7) is displayed, the advertiser who is selected in the thumbnail 202 is specified.

Next, in step S52, the CPU 23 searches for the number of times of selection 80 corresponding to the advertisement keyword and the advertiser (in the case of thumbnail, one of advertisers, who is selected therefrom) specified in step S51, and adds 1 to the number of times.

Further, in step S53, the CPU 23 refers to the user data 65 and the post data 66, and searches for a user who has posted the "post" that contains the advertisement keyword on which the tap operation has been performed at this time. Then, mainly as information used for processing relevant to affiliate, data indicating the number of times of tap operation on the advertisement keyword is stored in the user data 65 corresponding to the posting user. In another example, information indicating the user may be stored in the other information 72 of the advertiser data 62, for example. Then, based on such information, data for processing relevant to affiliate is generated at an appropriate timing and transmitted to the corresponding advertiser. In another exemplary embodiment, as a part of the processing in step S53, information about the posting user may be transmitted as the data for affiliate processing, to the corresponding advertiser. Thus, the advertisement keyword process is ended.

Returning to FIG. 16, as a result of the determination in step S14, if the content of the reception data does not indicate even a tap operation on an advertisement keyword (NO in step S14), in step S16, the CPU 23 executes another processing relevant to the SNS process as appropriate. For example, if the content of the reception data indicates "post", processing such as addition to the post data 66 is executed as appropriate based on the content contained in the reception data. Besides, processing of releasing the association between an advertiser and an advertisement keyword for which the contract period has expired is also executed. For example, when a valid period 81 set for an advertisement keyword has expired or when the number of times an advertisement keyword is selected has become equal to or greater than a predetermined number, processing of releasing the association between the advertisement keyword and the link destination information about the corresponding advertiser is also executed as appropriate. More specifically, the CPU 23 refers to the association table 78 corresponding to each advertisement keyword, and determines whether or not to release the association between the advertisement keyword and the link destination information about the corresponding advertiser, based on the number of times of selection 80 or the valid period 81. As a method for releasing the association, for example, data about the corresponding advertiser may be deleted from the association table 78. Alternatively, while such data in the association table 78 is maintained, in modification of a browse source in the processing of step S34, whether or not to contain link destination information about the corresponding advertiser in the thumbnail 202 may be determined based on the number of times of selection 80 or the valid period 81, so that such information is selectively contained, for example. This determination can be performed based on, for example, whether or not the valid period has expired or whether or not the number of times of selection 80 is equal to or greater than a predetermined number of times as described above.

Thereafter, in step S17, the CPU 23 determines whether or not a predetermined condition for ending the SNS process is satisfied (for example, whether or not an operator of the SNS server 20 has performed a process ending instruction). If the condition is not satisfied (NO in step S17), the process returns to step S11 to repeat the processing. On the other hand, if the ending condition is satisfied (YES in step S17), the SNS process is ended.

Figure 19:
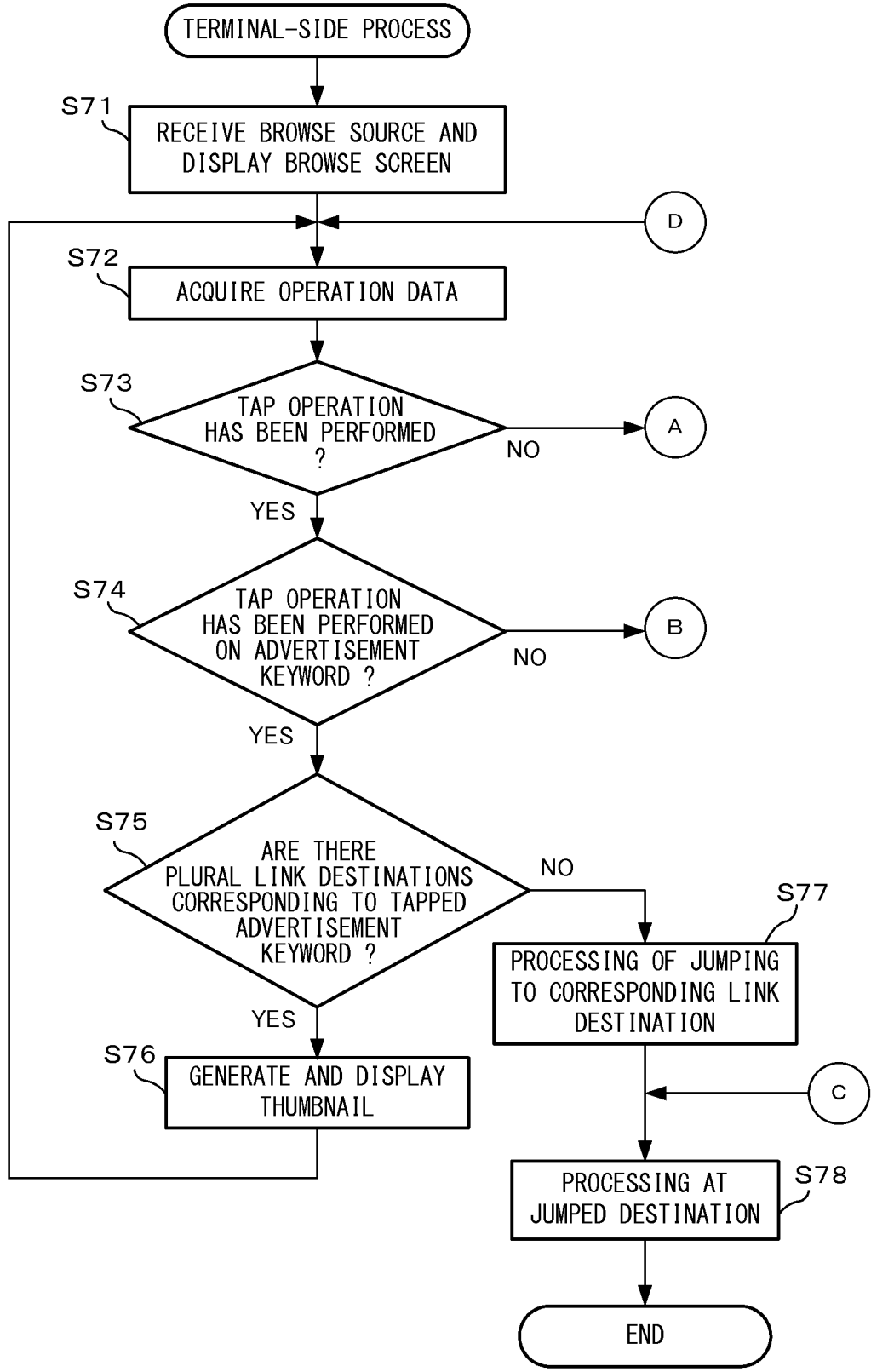
FIG. 19 is a flowchart showing a non-limiting example of the details of processing by the terminal apparatus 10.
Figure 20:
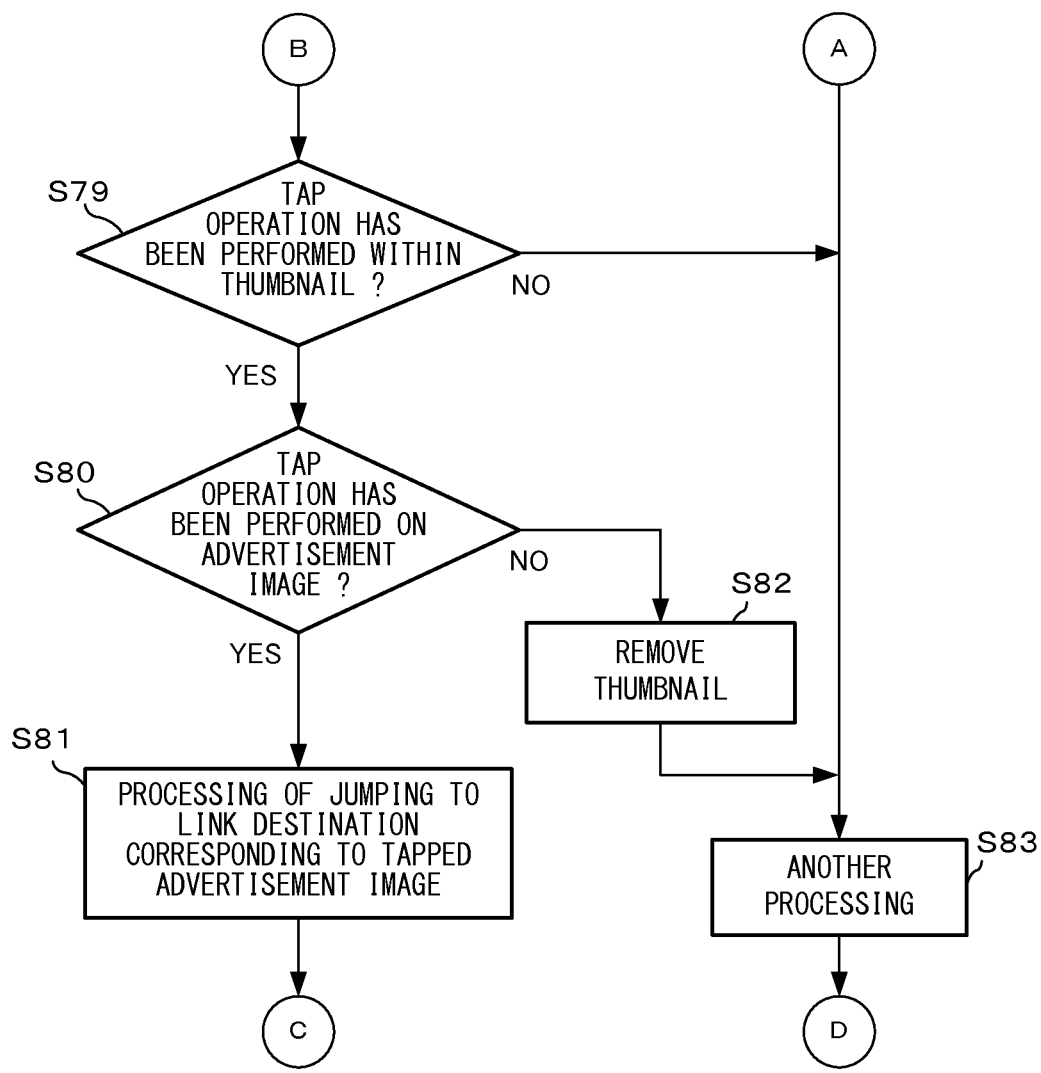
FIG. 20 is a flowchart showing a non-limiting example of the details of processing by the terminal apparatus 10.

Next, with reference to FIGS. 19 and 20, a process executed by each terminal apparatus 10 will be described. In the following description of the process, it is assumed that a tap operation is performed on an advertisement keyword to jump to the corresponding advertiser's site or to display a thumbnail 202. The detailed description of a process in the case of "press-and-hold" or the like is omitted, for simplification of the description and facilitating the understanding. The processes shown in FIGS. 17 to 20 are executed by the terminal apparatus 10 accessing the site of the SNS service in the exemplary embodiment via a predetermined Web browser. The processes to be described below are executed after the site is accessed and predetermined login processing and the like are performed. In addition, the processes to be described below are executed at the site of the SNS service in the exemplary embodiment. A process performed in the case of jumping to a site other than the SNS service in the exemplary embodiment is omitted. It is noted that the terminal apparatus 10 also executes a process for posting (transmitting) a post content to the SNS server 20, and a known method may be used for this process. Therefore, the process relevant to "post" is also omitted in the description below. That is, a process performed when a post content is browsed on the terminal apparatus will be mainly described.

In FIG. 19, after login processing has been finished, first, in step S71, in order to display a browse screen as an initial screen, the CPU 13 of the terminal apparatus 10 executes processing of transmitting a request for a browse source to the SNS server 20, receiving the browse source, and displaying a browse screen.

Next, in step S72, the CPU 13 acquires operation data 93. Next, in step S73, the CPU 13 determines whether or not a tap operation has been performed, based on the operation data 93. As a result, if a tap operation has not been performed (NO in step S73), the process proceeds to step S83 described later.

On the other hand, if a tap operation has been performed (YES in step S73), in step S74, the CPU 13 determines whether or not the tap operation has been performed on an advertisement keyword contained in the browse screen (in the case where there are a plurality of advertisement keywords contained, whether or not the tap operation has been performed on one of them). As a result of the determination, if the advertisement keyword (or one of the advertisement keywords) has been tapped (YES in step S74), in step S75, the CPU 13 determines whether or not there are a plurality of link destinations associated with the advertisement keyword on which the tap operation has been performed. This determination is performed based on, for example, a tag set for the advertisement keyword (for example, based on whether the tag is "a href" or "HREFTBL").

On the other hand, as a result of the above determination, if there are a plurality of such link destinations (YES in step S75), in step S76, the CPU 13 executes processing for generating and displaying a thumbnail 202 as described above. More specifically, this processing is performed as follows. First, the CPU 13 determines the number of advertisers (link destinations) associated with the advertisement keyword on which the tap operation has been performed. Next, based on the number, the CPU 13 determines the shape and the size of the thumbnail 202. Here, as shown in FIG. 7, substantially a rectangular shape that is horizontally long such that advertisement images can be displayed being horizontally arranged in a row is determined as the shape of the thumbnail 202. In addition, the size is determined as such a size that contains all advertisement images of the link destinations that have been determined. After the shape and the size are determined, the CPU 13 executes processing of placing the advertisement image for each advertiser in the thumbnail (determining the display position of the advertisement image). For example, processing of locating the respective advertisement images from left to right in accordance with the description order of link destinations in the "HREFTBL" is executed. Further, the CPU 13 executes processing of determining the placement position (display position) of the thumbnail 202 itself. This is determined based on the position of an advertisement keyword on which a tap operation has been performed, for example. That is, where the position of an advertisement keyword on which a tap operation has been performed is on the display screen (upper position, lower position, etc., on the screen), whether or not there is a space that allows the thumbnail 202 to be placed around the position, and the like are determined. For example, in the case where the display position of the advertisement keyword is contained within the lower half of the entire display screen, it is determined that the thumbnail 202 is to be placed on the upper side of the advertisement keyword. On the other hand, in the case where the display position of the advertisement keyword is contained within the upper half of the entire display screen, it is determined that the thumbnail 202 is to be placed on the lower side of the advertisement keyword. That is, the display position of the thumbnail 202 with respect to the vertical axis is determined. In addition, the CPU 13 determines whether the display position of the advertisement keyword on which the tap operation has been performed is on the right side or the left side in the entire display screen, and in accordance with this, determines the display position of the thumbnail 202 with respect to the horizontal axis of the display screen.

Figure 21:
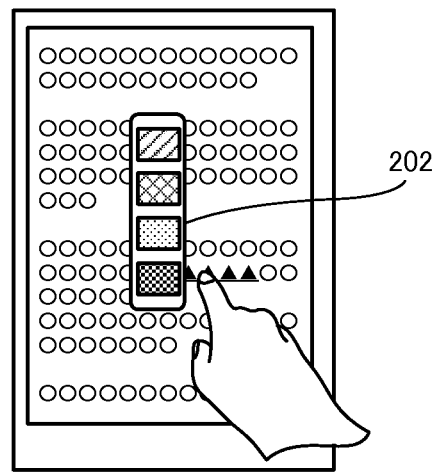
FIG. 21 is a non-limiting example of a display manner of a thumbnail.
Figure 22:
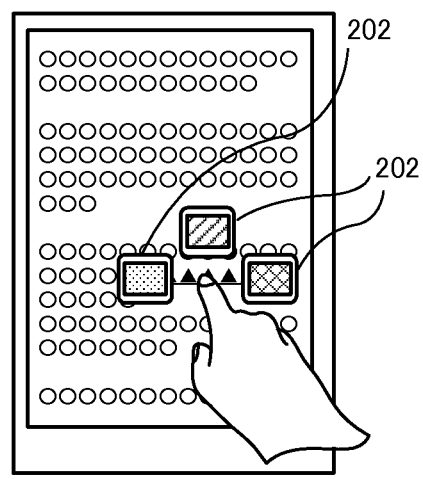
FIG. 22 is a non-limiting example of a display manner of a thumbnail.

Regarding the shape and the size of the thumbnail, instead of the above example, the size of the thumbnail 202 may be determined such that the number of rows or columns in the thumbnail is changed as appropriate in accordance with the number of link destinations. For example, if the number of link destinations is "3", the thumbnail 202 as shown in FIG. 7 may be displayed, or if the number of link destinations is "6", a thumbnail of 3 rows×2 columns may be displayed. In addition, also the shape and design of the thumbnail 202 are not limited to the above example. For example, the thumbnail 202 may have a design of vertically-arranged display (see FIG. 21), or for example, a design in which advertisement images are arranged around the tapped position, in a ring shape or a fan shape, for example (see FIG. 22). Alternatively, the terminal apparatus 10 may perform determination and adjustment so that, for example, when the terminal apparatus 10 is used in a vertical screen display state, a thumbnail 202 having a design in which advertisement images are arranged in a vertical direction may be used, and when the terminal apparatus 10 is used in a horizontal screen display state, a thumbnail 202 having a design in which advertisement images are arranged in a horizontal direction may be used. In another exemplary embodiment, a basic shape (design) of the thumbnail 202 may be allowed to be designated by a user of the terminal apparatus 10. In addition, regarding the placement position of each advertisement image in the thumbnail, instead of dynamic change by the server as described above, the terminal apparatus 10 may dynamically change the placement position. For example, the terminal apparatus 10 may randomly determine the placement position.

Returning to FIG. 19, as a result of the determination in step S75, if there is a single link destination associated (NO in step S75), in step S77, the CPU 13 executes processing of jumping to the link destination. Thereafter, in step S78, various processings at the advertiser's site that is the jumping destination are executed.

Next, a process to be performed when it is determined as a result of the determination in step S74 that the tap operation has not been performed on an advertisement keyword (NO in step S74) will be described. In this case, in step S79, the CPU 13 determines whether or not the tap operation has been performed within the thumbnail 202. As a result, if the tap operation has been performed within the thumbnail 202 (YES in step S79), in step S80, the CPU 13 determines whether or not one of advertisement images displayed in the thumbnail has been tapped. As a result, if the tap operation has been performed on one of the advertisement images (YES in step S80), in step S81, processing of jumping to a link destination of an advertiser associated with the tapped advertisement image is executed. Then, the process proceeds to step S78.

On the other hand, as a result of the determination in step S80, if the tapped position is not on any of the advertisement images though the tapped position is within the thumbnail 202 (NO in step S80), in step S82, the CPU 13 executes processing of removing the thumbnail 202 from the screen. Then, the process proceeds to step S83. In another exemplary embodiment, the processing of step S82 may not be performed.

On the other hand, as a result of the determination in step S79, if the tap operation has not been performed within the thumbnail 202 (NO in step S79), in step S83, the CPU 13 executes another processing relevant to the SNS service as appropriate. This processing includes the following processings, for example. For example, if the user's operation is an operation for making a new post, processing for transmitting the post to the SNS server 20 is executed. In addition, for example, while the thumbnail 202 is being displayed, if the tap operation has been performed on a position outside the thumbnail 202 (except for a tap on an advertisement keyword), processing of removing the displayed thumbnail 202 is executed. In addition, if the user's operation is an operation for scrolling the screen, screen scroll control is performed as appropriate based on the operation. In addition, if the user's operation is an operation for requesting a new browse screen, processing of transmitting a browse request to the SNS server 20, receiving a browse source, and displaying a browse screen based on the browse source, is executed. In other words, when an operation considered to intend selection of an advertisement keyword, such as a tap operation, has been performed by a user, a thumbnail 202 as described above is displayed, and when an operation that does not intend such selection, such as a scroll operation, has been performed, a thumbnail 202 is not displayed. Besides, various processings based on the operation indicated by the operation data 93 are executed as appropriate.

Thereafter, the process returns to step S72 to repeat the processing. Thus, the description of the process executed by the terminal apparatus 10 is ended.

Thus, in the exemplary embodiment, a predetermined character string is defined and set as an advertisement keyword, and if this character string is contained in the post content in an SNS or the like, this character string itself can be utilized as an advertisement medium. As a result, since a screen displayed when a user is utilizing an SNS is not occupied by an advertisement banner or the like, the user can utilize the SNS service comfortably. In addition, the frequency at which a user sees an advertisement that the user is not interested in can be reduced, and the user can accurately view an advertisement about a matter that the user is interested in. In addition, a user who makes an affiliate contract can obtain affiliate income by only utilizing an SNS (performing conversations in an SNS) as usual.

In addition, since a screen of the SNS service displayed on the terminal apparatus 10 is not occupied by an advertisement banner or the like, a provider of an SNS service can put an advertisement without deteriorating usability, convenience, and the like for a user in the SNS service, and can obtain income by an advertisement fee.

In addition, an advertiser can put an advertisement into a closed community such as an SNS, and can put an appropriate advertisement into a place where persons who are comparatively interested in the content of the advertisement gather. In addition, it is possible to put an advertisement by only selecting an "advertisement keyword" presented by a provider, and therefore the cost for putting an advertisement can be reduced, for example. Thus, according to the exemplary embodiment, an advertisement system beneficial for three persons of a user, a provider, and an advertiser can be provided.

In the above exemplary embodiment, the case of using a character string as an advertisement keyword has been shown as an example. Instead, an image may be used as an advertisement keyword. For example, an image of a main character of a predetermined movie may be used as an advertisement keyword, and when a tap operation is performed on this image, the screen may jump to an advertiser's site associated with this movie.

In addition, regarding elements displayed by the thumbnail 202, the case of displaying images by the thumbnail 202 has been shown in the above example. However, a character string such as an advertiser's name may be displayed together with such an image in the thumbnail 202, or only a character string such as an advertiser's name may be displayed by the thumbnail 202 without using an image.

In addition, an advertisement fee to be paid from an advertiser to a provider may be calculated in accordance with an advertisement usage condition of users. For example, for an advertisement keyword on which many tap operations are performed by users, an advertisement fee may be calculated as a high price. For example, the SNS server 20 may automatically calculate an advertisement fee based on the number of times of selection 80, and may automatically notify an advertiser of the value of the fee.

In addition, in the above exemplary embodiment, the case where a touch operation is performed on the terminal apparatus 10 having a touch panel has been shown as an example. Instead, for example, in the case of using a mouse as an input device, the following operation can be assumed. For example, the case of performing an operation of displaying a thumbnail 202 as described above for an advertisement keyword associated with a plurality of link destinations will be described. In this case, a single click, a double click, an operation of pressing and holding a click button, an operation of keeping a mouse cursor on an advertisement keyword for a predetermined time period or longer, or the like corresponds to the above tap operation (in another example, the press-and-hold operation). In other words, when a "first operation" considered to intend selection is performed by a user, a thumbnail 202 as described above may be displayed, and when a "second operation" which is not such an operation, for example, a screen scrolling operation or an operation of merely passing a mouse cursor on an advertisement keyword is performed, a thumbnail 202 may not be displayed.

In addition, in the above example, the case where the process relevant to the SNS service by the terminal apparatus 10 is executed on a Web browser has been shown. However, as a matter of course, the process may be executed by a "dedicated application" that can execute the above process.

In addition, in the above exemplary embodiment, the case of a membership network service such as the SNS has been shown as an example. Instead of such a service, the processes in the above exemplary embodiment can be also applied to an opened network service of non-membership type. In addition, instead of a content sharing service such as the SNS, for example, the above processes can be also applied to a so-called anonymous board service or the like. For example, a hyperlink may be set on an advertisement keyword contained in a written text such as a comment in such an anonymous board. Then, when a tap operation is performed on the advertisement keyword, an advertisement (or a plurality of advertisements) may be displayed as described above.

In addition, the above exemplary embodiment has shown an example of purposing "advertisement". In another exemplary embodiment, the above processes may be applied for a purpose other than advertisement. That is, when a tap operation has been performed on a predetermined character string in a post in an SNS, or the like, images indicating a plurality of link destinations (which may purpose advertisement or may not purpose advertisement) may be displayed as shown by the thumbnail 202, and when a tap operation has been performed on one of the images, the screen may jump to the corresponding link destination (which is a site highly relevant to the character string, for example).

In addition, in the above exemplary embodiment, the case of storing data of advertisement pages in a server apparatus (advertiser server 30) other than the SNS service server 20 has been shown as an example. In another exemplary embodiment, the data of advertisement pages may be stored in the SNS service server 20.

In addition, in the above exemplary embodiment, the case where the SNS server 20 executes the process for registering an advertisement keyword, and the process for, when an advertisement keyword is contained in a browse source to be transmitted to the terminal apparatus 10, hyperlinking the part related to the advertisement keyword, has been shown as an example. Regarding these processes by the SNS server 20, in another exemplary embodiment, the server system 20 may be formed by a plurality of information processing apparatuses, and execution of these processes to be executed by the SNS server 20 may be shared by the plurality of information processing apparatuses. For example, a first information processing apparatus for executing processing relevant to payment and a second information processing apparatus for executing processing relevant to communication with the terminal apparatus 10 may operate in a coordinated manner. Similarly, execution of the processing by the terminal apparatus 10 may also be shared by a plurality of information processing apparatuses.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. A computer system that provides web pages to requesting computer devices, the computer system comprising:
  a processing system that includes at least one hardware processor, the processing system, configured to:
  store keyword information that includes a plurality of entries for keywords, where each one of the plurality of entries is associated with link destination information for web page locations, wherein at least a first keyword, of the keywords, is associated with plural pieces of link destination information;
  receive, from a requesting computer device, a request to provide a web page to the requesting computer device, the web page to include textual data to be displayed as part of the web page;
  detect, with reference to the stored keyword information, that the textual data for the requested web page includes at least the first keyword;
  generate source data for the requested web page, wherein the generation of the source data includes the plural pieces of link destination information for the detected first keyword, wherein generated source data includes source data that causes the requesting computer device to:
  display a first display element at a position in a displayed webpage associated with a position of the detected first keyword within the webpage,
  determine a type of input provided in correspondence with where the first display element is located within the displayed webpage, wherein the type of input is at least one of a first operation input type and a second operation input type,
  based on detection that the type of input is a first operation input type, display a plurality of second display elements to be superimposed on the web page, wherein the plurality of second display elements are associated with a link destination from the plural pieces of link destination information and used to jump to a plurality of web page locations, and
  based on detection that the type of input is a second operation input type, jump to a web page location by using the link destination associated with one of the plural pieces of link destination information; and
  transmit the generated source data to the requesting computer device for rendering into the webpage.

2. A server used in an information processing system for providing a service that allows posting and sharing of content, the server comprising:
  a memory device configured to store:
    a plurality of entries for specific information, which each one of the plurality of entries indicating a corresponding display element among a plurality of display elements that can be displayed as part of a web page;
    link destination information indicating a web page location to be associated with a corresponding entry in the plurality of entries, wherein at least a first entry of the plurality of entries corresponds to a plurality of web page locations;
  a transceiver configured to receive, from a user computer device, a request to provide a web page to the user computer device, the web page to include textual data to be displayed as part of the web page;
  at least one hardware processor coupled the memory device and the transceiver, the at least one hardware processor configured to:
    detect, with reference to the specific information that includes the plurality of entries, at least a first display element of the plurality of display elements to be included in rendering the requested web page on the user computer device;

generate source data for the requested web page, wherein the generation of the source data includes dynamic generation of source data for rendering, by the user computer device, a first display element as part of the requested web page, wherein the first display element corresponds to the first entry of the plurality of entries, wherein the generated source data includes source data that causes the user computer device to:

determine a type of input provided in correspondence with where the first display element is located within the web page, wherein the type of input is at least one of a first operation input type and a second operation input type;

based on determination that the type of input is the first operation input type, display a plurality of second display elements to be superimposed on the web page, wherein the plurality of second display elements hyperlink to one of the plurality of web page locations, and based on determination that the type of input is the second operation input type, perform control for jumping to a web page location for one of the plurality of web page locations associated with the first entry of the plurality of entries; and transmit the generated source data to the user computer device that requested the web page.

3. The server according to claim 2, wherein at least one of the hyperlinked plurality of web page locations is to another server outside the service provided in the information processing system.

4. The server according to claim 2, wherein the least one hardware processor is further configured to authenticate a user to utilize the service, wherein only authenticated users are allowed to post or browse the content.

5. The server according to claim 2, wherein the link destination information indicating the web page is stored in accordance with a request from an advertiser which is different from a user who submitted the request for the web page or a user who has generated content.

6. The server according to claim 2, wherein the at least one hardware processor is further configured to:
receive, from a third-party computer system, a request for storing a new display element and a new web page location;
process the request to store the new display element as one of the plurality of entries and to store the new web page location in correspondence with the entry of the plurality of entries that indicates the new display element.

7. The server according to claim 6, wherein the at least one hardware processor is further configured to:
determine whether payment has been received in association with the received request for the new display element and the new web page location; and
create the new display element and the new web page location available for inclusion into generate source data in response to determination that payment has been received for the new display element and the new web page location.

8. The server according to claim 2, wherein the at least one hardware processor is further configured to:
determine a usage value for each one of the plurality of web page locations based on the number of times a user input operation has selected the corresponding second display element or has caused hyperlinking to a corresponding web page; and
calculate a usage fee value based on the determined usage value.

9. The server according to claim 2, wherein the at least one hardware processor is further configured to:
store a valid period conditions that determine whether an association between a corresponding entry and a web page location is still valid;
in response to determination that a valid period condition is not still valid, the source data does not include a hyperlink for the associated web page location.

10. The server according to claim 2, wherein the at least one hardware processor is further configured to:
store a selected count that corresponds to a number of times that a given one of the plurality of web page locations has been selected by via input;
in response to determination that the selected count exceeds a threshold, the source data does not include a hyperlink for the associated web page location.

11. The server according to claim 2, wherein the at least one hardware processor is further configured to: count each one of the plurality of web page locations selected by a user operation.

12. The server according to claim 2, wherein each display element is a unique character string.

13. A non-transitory computer-readable storage medium having stored therein an information processing program to be executed by a computer of a server used in an information processing system for providing a service that allows posting and sharing of digital content, the information processing program comprising instructions that cause the computer to:

store, to a memory device coupled to the server, a plurality of entries for specific information, which each one of the plurality of entries indicating a corresponding display element among display elements that can be displayed as part of a web page;

store, to the memory device, link destination information indicating a web page location to be associated with a corresponding entry in the plurality of entries, wherein at least a first entry of the plurality of entries corresponds to a plurality of web page locations;

receive, from a user computer device, a request to provide a web page to the user computer device, the web page to include textual data to be displayed as part of the web page;

detect, with reference to the specific information that includes the plurality of entries, at least a first display element of the plurality of display elements included in rendering the requested web page on the user computer device;

generate source data for the requested web page, wherein the generated source data includes source data that causes the requesting user computer device to:

determine a type of input provided in correspondence with where the first display element is located within the displayed webpage, wherein the type of input is at least one of a first operation input type and a second operation input type, based on determination that the type of input is the first operation input type, display a plurality of second display elements to be superimposed on the web page, wherein the plurality of second display elements hyperlink to the plurality of web page locations, and based on determination that the type of input is the second operation input type, perform control to jump to a link destination for one of the plurality of web page locations associated with the first entry of the plurality of entries; and transmit the generated source data to the user computer device that requested the web page.

14. A server system used in an information processing system, the server system comprising a processor configured to:

store, to a memory device coupled to the server, a plurality of entries for specific information, which each one of the plurality of entries indicating a corresponding display element among display elements that can be displayed as part of a web page;

store, to the memory device, link destination information indicating a web page location to be associated with a corresponding entry in the plurality of entries, wherein at least a first entry of the plurality of entries corresponds to a plurality of web page locations;

receive, from a user computer device, a request to provide a web page to the user computer device, the web page to include textual data to be displayed as part of the web page;

detect, with reference to the specific information that includes the plurality of entries, at least a first display element of the plurality of display elements to be included in rendering of the requested web page on the user computer device;

generate source data for the requested web page, wherein generated source data includes source data that causes the requesting user computer device to:

display the requested web page with the first display element, determine a type of input provided in correspondence with where the first display element is located within the web page, wherein the type of input is at least one of a first operation input type and a second operation input type, based on detection that the type of input is the first operation input type, render a plurality of second display elements to be superimposed on the web page, wherein the plurality of second display elements hyperlink to one of the plurality of web page locations, and based on detection that the type of input is the second operation input type, perform control to jump to one of the plurality of web page locations associated with the first entry of the plurality of entries; and transmit the generated source data to the user computer device that requested the web page.

15. An information processing system comprising:

at least one server; and a plurality of user computer devices, the at least one server comprising a processor configured to:

store, to a memory device coupled to the server, a plurality of entries for specific information, which each one of the plurality of entries indicating a corresponding display element among display elements that can be displayed as part of a web page;

store, to the memory device, link destination information indicating a web page location to be associated with a corresponding entry in the plurality of entries, wherein at least a first entry of the plurality of entries corresponds to a plurality of web page locations;

receive, from the user computer device, a request to provide a web page to the user computer device, the web page to include textual data to be displayed as part of the web page;

detect, with reference to the specific information that includes the plurality of entries, at least a first display element of the plurality of display elements to be included in rendering the requested web page on the user computer device;

generate source data for the requested web page, wherein the generation of the source data includes dynamic creation of source data for rendering a first display element as part of the requested web page, wherein the first display element corresponds to the first entry of the plurality of entries, wherein rendering of the dynamically created source data further includes source data for determination of a first operation input type and a second operation input type and, in response to an operation input type determination of operation input type, taking one of at least two further actions; and transmit the generated source data to the user computer device that requested the web page, wherein each of the plurality of user computer devices includes a processor configured to:

receive input data from an input device;

receive, from the at least one server, the transmitted source data;

rendering, to a display coupled to the user computer device, a web page based on the received source data;

determine a type of input provided in correspondence with where the first display element is located within the web page;

in response to determination that the type of input is for the first operation input type, render the plurality of second display elements to be superimposed on the rendered web page;

in response to determination that the type of input is for the second operation input type, performing a jumping operation to jump to one of the plurality of web page locations that are associated with the first display element.

16. The server of claim 2, wherein the selection of the first display element is part of a continuous input, wherein the release of the continuous input at the position on the web page corresponds to the position of one of the plurality of second display elements.

17. The computer system of claim 1, wherein the first operation input type is a tap operation and the second operation input type is a double-tap operation or press and hold operation.

* * * * *